US012392961B2

(12) United States Patent
Yu et al.

(10) Patent No.: US 12,392,961 B2
(45) Date of Patent: Aug. 19, 2025

(54) STRUCTURE AND PROCESS FOR PHOTONIC PACKAGES

(71) Applicant: Taiwan Semiconductor Manufacturing Co., Ltd., Hsinchu (TW)

(72) Inventors: Chen-Hua Yu, Hsinchu (TW); Hsing-Kuo Hsia, Jhubei (TW); Kuo-Chiang Ting, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 18/366,758

(22) Filed: Aug. 8, 2023

(65) Prior Publication Data
US 2023/0384517 A1 Nov. 30, 2023

Related U.S. Application Data

(62) Division of application No. 17/232,567, filed on Apr. 16, 2021, now Pat. No. 12,135,454.

(51) Int. Cl.
*G02B 6/122* (2006.01)
*G02B 6/12* (2006.01)

(52) U.S. Cl.
CPC ....... *G02B 6/1225* (2013.01); *G02B 6/12019* (2013.01); *G02B 2006/1213* (2013.01); *G02B 2006/12173* (2013.01); *G02B 2006/12176* (2013.01)

(58) Field of Classification Search
CPC .... G02B 6/12; G02B 6/1225; G02B 6/12019; G02B 2006/1213; G02B 2006/12173; G02B 2006/12176
See application file for complete search history.

(56) References Cited

U.S. PATENT DOCUMENTS

| 10,267,988 | B2* | 4/2019 | Huang ................ G02B 6/43 |
| 2010/0327381 | A1 | 12/2010 | Morse et al. |
| 2016/0124166 | A1 | 5/2016 | Braunisch et al. |
| 2017/0219785 | A1 | 8/2017 | Pinguet et al. |
| 2017/0285263 | A1 | 10/2017 | Pinguet et al. |
| 2018/0180808 | A1 | 6/2018 | Zhang et al. |
| 2019/0319139 | A1 | 10/2019 | Cho et al. |
| 2021/0088723 | A1 | 3/2021 | Yu et al. |

FOREIGN PATENT DOCUMENTS

| CN | 110391303 A | 10/2019 |
| JP | 2006133723 A | 5/2006 |
| TW | 201115772 A | 5/2011 |
| TW | 201118919 A | 6/2011 |

* cited by examiner

Primary Examiner — Tina Wong
(74) Attorney, Agent, or Firm — Slater Matsil, LLP

(57) ABSTRACT

Semiconductor devices and methods of forming the semiconductor devices are described herein. A method includes providing a first material layer between a second material layer and a semiconductor substrate and forming a first waveguide in the second material layer. The method also includes forming a photonic die over the first waveguide and forming a first cavity in the semiconductor substrate and exposing the first layer. Once formed, the first cavity is filled with a first backfill material adjacent the first layer. The methods also include electrically coupling an electronic die to the photonic die. Some methods include packaging the semiconductor device in a packaged assembly.

20 Claims, 27 Drawing Sheets

STRUCTURE AND PROCESS FOR PHOTONIC PACKAGES

PRIORITY CLAIM AND CROSS-REFERENCE

This application is a divisional of U.S. patent application Ser. No. 17/232,567, filed on Apr. 16, 2021, now U.S. Pat. No. 12,135,454, issued Nov. 5, 2024, which application is hereby incorporated herein by reference.

BACKGROUND

Electrical signaling and processing have been the mainstream techniques for signal transmission and processing. Optical signaling and processing have been used in increasingly more applications in recent years, particularly due to the use of optical fiber-related applications for signal transmission.

Optical signaling and processing are typically combined with electrical signaling and processing to provide fullfledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
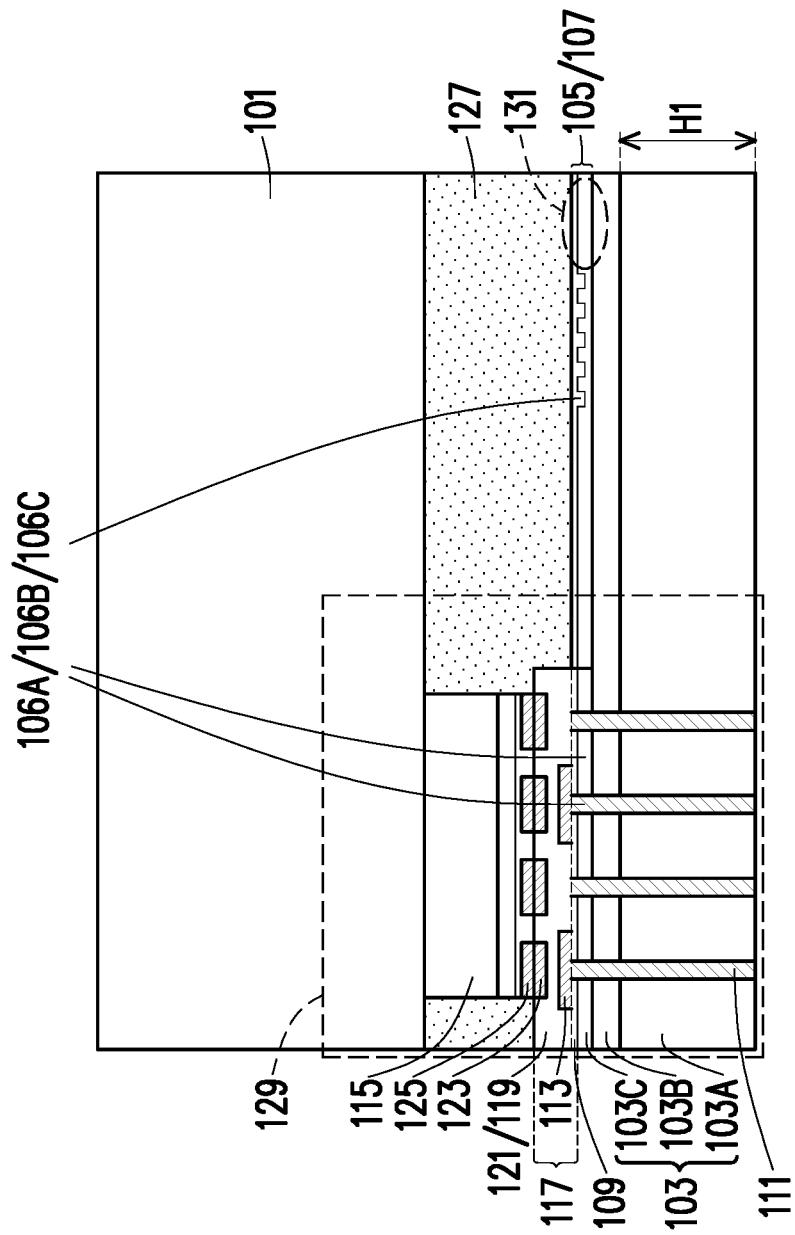
FIGS. 1A, 1B, 2, and 3 illustrate cross-sectional views of forming a first optical engine, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments will now be described with respect to specific methods and processes which work to protect sensitive components of photonic integrated circuits such as grating couplers and waveguides and packages formed using the photonic integrated circuits. However, the embodiments discussed herein are intended to be representative and are not meant to limit the embodiments in any fashion. The intermediate stages of forming the packages are illustrated, in accordance with some embodiments. Some variations of some embodiments are discussed. Throughout the various views and illustrative embodiments, like reference numbers are used to designate like elements.

Figure 1B:
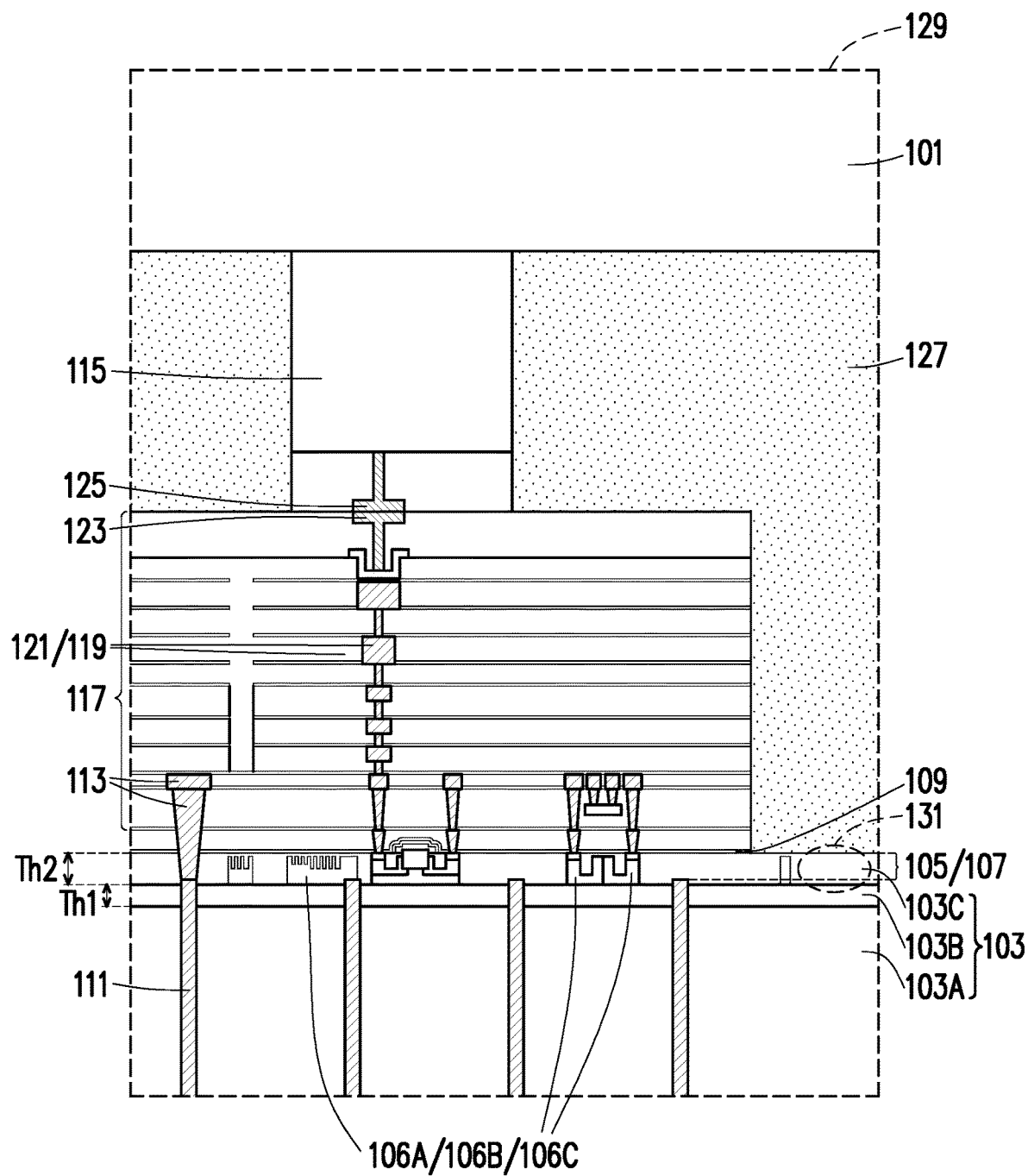

FIGS. 1A and 1B illustrate cross-sectional views of intermediate structures formed during intermediate steps in forming a first optical engine 300 (see FIG. 3), in accordance with some embodiments. FIG. 1B represents a magnified view of a first region 129 of the intermediate structure illustrated in FIG. 1A.

The first optical engine 300 may be formed by initially forming a buried oxide ("BOX") substrate 103, in accordance with some embodiments. The BOX substrate 103 comprises an buried oxide layer 103B located over a semiconductor substrate 103A, and a silicon layer 103C located over the buried oxide layer 103B. The semiconductor substrate 103A may be, for example, a material such as a glass, ceramic, dielectric, a semiconductor, the like, or a combination thereof. In some embodiments, the semiconductor substrate 103A may be a semiconductor substrate, such as a bulk semiconductor or the like, which may be doped (e.g., with a p-type or an n-type dopant) or undoped. The semiconductor substrate 103A may be a wafer, such as a silicon wafer (e.g., a 12 inch silicon wafer, or the like). Other substrates, such as a multi-layered or gradient substrate may also be used. In some embodiments, the semiconductor material of the semiconductor substrate 103A may include silicon; germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. The buried oxide layer 103B may be, for example, a silicon oxide or the like. In some embodiments, the buried oxide layer 103B may have a first thickness Th1 of between about 0.5 μm and about 4 μm, in some embodiments. The silicon layer 103C may be, for example, silicon, silicon nitride (SiN), or the like. In some embodiments, the silicon layer 103C may have a second thickness Th2 of between about 0.1 μm and about 1.5 μm, in some embodiments. However, any suitable thicknesses may be used for the first thickness Th1 and the second thickness Th2. The BOX substrate 103 may be referred to as having a front side or front surface (e.g., the side facing upwards in FIG. 1A), and a back side or back surface (e.g., the side facing downwards in FIG. 1A).

In some embodiments first through insulator vias (TIVs) 111 may be formed by initially forming via openings extending through one or more of the patterned silicon layer 103C, the buried oxide layer 103B, and into but not through the semiconductor substrate 103A. The via openings may be formed by acceptable photolithography and etching techniques, such as by forming and patterning a photoresist and then performing an etching process using the patterned photoresist as an etching mask. Once the via openings have been formed, a conductive material is formed in the via openings, thereby forming the first TIVs 111, in accordance with some embodiments. In some embodiments, a liner (not shown), such as a diffusion barrier layer, an adhesion layer, or the like, may be formed in the openings from TaN, Ta, TiN, Ti, CoW, or the like, and may be formed using suitable a deposition process such as ALD or the like. In some embodiments, a seed layer (not shown), which may include copper or a copper alloy may then be deposited in the via openings. The conductive material of the first TIVs 111 is formed in the via openings using, for example, electrochemical plating (ECP) or electro-less plating. The conductive material may include, for example, a metal or a metal alloy such as copper, silver, gold, tungsten, cobalt, aluminum, or alloys thereof. A planarization process, such as a CMP process or mechanical grinding may be performed to remove excess conductive material and planarize the first TIVs 111 with the chosen layer (e.g., the buried oxide layer 103B as illustrated, although any suitable layer may be chosen).

According to some embodiments, the silicon layer 103C is patterned to form first waveguides 105 and/or first photonic components 107, in accordance with some embodiments. The silicon layer 103C may be patterned using suitable photolithography and etching techniques. For example, a hardmask layer (e.g., a nitride layer or other dielectric material, not shown in FIG. 1A) may be formed over the silicon layer 103C and patterned, in some embodiments. The pattern of the hardmask layer may then be transferred to the silicon layer 103C using one or more etching techniques, such as dry etching and/or wet etching techniques. For example, the silicon layer 103C may be etched to form recesses, the remaining un-recessed portions of the silicon layer 103C forming one or more of the first waveguides 105. In the case of a plurality of the first waveguides 105 being formed, the first waveguides 105 may be individual separate waveguides or connected as a single continuous structure (e.g., continuous loop). The patterned silicon layer 103C may also be referred to herein as a "photonic layer."

The first photonic components 107 may be integrated with the first waveguides 105, and contacts may be formed over the first photonic components 107. The first photonic components 107 may be optically coupled to the first waveguides 105 to interact with optical signals within the first waveguides 105. The first photonic components 107 may include, for example, grating couplers, photodetectors, and/or modulators. For example, a grating coupler 106A may be optically coupled to a first waveguide 105 to externally transmit the optical signal within the first waveguide 105 (e.g., to an optical fiber 413, see FIG. 4), a photodetector 106B may be optically coupled to a first waveguide 105 to detect optical signals within the first waveguide 105, and a modulator 106C may be optically coupled to a first waveguide 105 to generate optical signals within the first waveguide 105 by modulating optical power within the first waveguide 105. In this manner, the first photonic components 107 facilitate the input/output (I/O) of optical signals to and from the first waveguides 105. In other embodiments, the first photonic components 107 may include other active or passive components, such as laser diodes, waveguide edge couplers, optical signal splitters, or other types of photonic structures or devices. Optical power may be provided to the first waveguides 105 by, for example, the optical fiber 413 (see FIG. 4) or generated by a first photonic component 107 such as a laser diode.

The grating couplers 106A may be formed using acceptable photolithography and etching techniques. In an embodiment, the grating couplers 106A are formed after the first waveguides 105 are defined. For example, a photoresist may be formed on the first waveguides 105 and patterned. The photoresist may be patterned with openings corresponding to the grating couplers 106A. One or more etching processes may be performed using the patterned photoresist as an etching mask to form recesses in the first waveguides 105 that define the grating couplers 106A. The etching processes may include one or more dry etching processes and/or wet etching processes.

In some embodiments, the photodetectors 106B may be formed by, for example, etching regions of the first waveguides 105 and growing an epitaxial material on the remaining silicon of the etched regions. The first waveguides 105 may be etched using acceptable photolithography and etching techniques. The epitaxial material may be, for example a semiconductor material such as germanium (Ge), which may be doped or un-doped. In some embodiments, an implantation process may be performed to introduce dopants within the silicon of the etched regions as part of the formation of the photodetector 106B. The silicon of the etched regions may be doped with p-type dopants, n-type dopants, or a combination.

In some embodiments, the modulators 106C may be formed by, for example, etching regions of the first waveguides 105 and then implanting appropriate dopants within the remaining silicon of the etched regions. The first waveguides 105 may be etched using acceptable photolithography and etching techniques. In some embodiments, the etched regions used for the photodetectors 106B and the etched regions used for the modulators 106C may be formed using one or more of the same photolithography or etching steps. The silicon of the etched regions may be doped with p-type dopants, n-type dopants, or a combination. In some embodiments, the etched regions used for the photodetectors 106B and the etched regions used for the modulators 106C may be implanted using one or more of the same implantation steps.

In accordance with some embodiments, a passivation layer 109 is formed on the front side of the BOX substrate 103. The passivation layer 109 is formed over the first waveguides 105 and the first photonic components 107 patterned into the silicon layer 103C and over the buried oxide layer 103B. The passivation layer 109 may be formed of silicon oxide, silicon nitride, a combination thereof, or the like, and may be formed by CVD, PVD, atomic layer deposition (ALD), a spin-on-dielectric process, the like, or a combination thereof. In some embodiments, the passivation layer 109 may be formed by a high density plasma chemical vapor deposition (HDP-CVD), a flowable CVD (FCVD) (e.g., a CVD-based material deposition in a remote plasma system and post curing to make it convert to another material, such as an oxide), the like, or a combination thereof. Other dielectric materials formed by any acceptable process may be used. In some embodiments, the passivation layer 109 is then planarized using a planarization process such as a chemical-mechanical polishing (CMP) process, a grinding process, or the like.

Due to the difference in refractive indices of the materials of the first waveguides 105 and passivation layer 109, the first waveguides 105 have high internal reflections such that light is confined within the first waveguides 105, depending on the wavelength of the light and the reflective indices of the respective materials. In an embodiment, the refractive index of the material of the first waveguides 105 is higher than the refractive index of the material of the passivation layer 109.

FIGS. 1A and 1B also show the formation of a series of conductive feature 121, dielectric layers 119, and contacts 113 that extend to the first TIVs 111 and the first photonic components 107 as part of a photonic die 117. In an embodiment the photonic die 117 comprises the dielectric layers 119 and contacts 113 and conductive feature 121 formed in the dielectric layers 119 that provide interconnections and optical/electrical routing between the electronic die 115 and the first waveguide 105 and the first photonic components 107. For example, the photonic die 117 may electrically connect the first TIVs 111, the contacts 113 of the first photonic components 107, and overlying devices such as electronic die 115. The dielectric layers 119 may be, for example, insulating or passivating layers, and may include a material similar to those described above for the passivation layer 109, such as a silicon oxide, or may include a different material. The dielectric layers 119 may be formed using a technique similar to those described above for the passivation layer 109 or using a different technique. The conductive feature 121 may include conductive lines and vias, and may be formed by a damascene process, e.g., dual damascene, single damascene, or the like. In the topmost layer of the photonic die 117, conductive pads 123 are formed in the dielectric layers 119. A planarization process (e.g., a CMP process or the like) may be performed after forming the conductive pads 123 such that surfaces of the conductive pads 123 and the topmost dielectric layer 119 are substantially coplanar. The photonic die 117 may include more or fewer dielectric layers 119, conductive feature 121, or conductive pads 123 than shown in FIG. 1. The photonic die 117 may be formed having a thickness between about 4 µm and about 7 µm, in some embodiments. The photonic die 117 may also be referred to herein as a P-die or P-die layer.

For example, the contacts 113 may make electrical connection to the first photonic components 107 such as photodetectors 106B and/or modulators 106C. The contacts 113 allow electrical power or electrical signals to be transmitted to the first photonic components 107 and electrical signals to be transmitted from the first photonic components 107. In this manner, the first photonic components 107 may convert electrical signals from an electronic die 115 into optical signals transmitted by the first waveguides 105, and/or convert optical signals from the first waveguides 105 into electrical signals that may be received by the electronic die 115. The contacts 113 may be formed before or after formation of the first TIVs 111, and the formation of the contacts 113 and the formation of the first TIVs 111 may share some steps such as deposition of the conductive material or planarization. In some embodiments, the contact may be formed by a damascene process, e.g., dual damascene, single damascene, or the like. For example, in some embodiments, openings (not shown) for the contacts 113 are first formed in the passivation layer 109 using acceptable photolithography and etching techniques. A conductive material may then be formed in the openings, forming the contacts 113. The conductive material of the contacts 113 may be formed of a metal or a metal alloy including aluminum, copper, tungsten, or the like, which may be the same as that of the first TIVs 111. The contacts 113 may be formed using other techniques or materials in other embodiments.

According to some embodiments, the dielectric layers 119 are etched to expose a portion of the first waveguide 105. The dielectric layers 119 may be etched using acceptable photolithography and etching techniques. The etch process may be any suitable process used to remove the material of the dielectric layers 119 without substantially removing material of the first waveguide 105. Once the portion has been exposed, a first portion of a gap-fill material 127 may be used to fill and/or overfill the first portion of the first waveguide. The gap-fill material 127 may be formed of silicon oxide, silicon nitride, a polymer, the like, or a combination thereof. The gap-fill material 127 may be formed by CVD, PVD, ALD, a spin-on-dielectric process, the like, or a combination thereof. In some embodiments, the gap-fill material 127 may be formed by HDP-CVD, FCVD, the like, or a combination thereof. However, other dielectric materials formed by any acceptable process may be used.

Once deposited, the gap-fill material 127 may be planarized, in accordance with some embodiments. The gap-fill material 127 may be planarized using a planarization process such as a CMP process, a grinding process, or the like. The planarization process may expose the photonic die 117 such that surfaces of the photonic die 117 and surfaces of the gap-fill material 127 are coplanar.

Once the photonic die 117 has been formed, the electronic dies 115 are bonded to the photonic die 117, in accordance with some embodiments. The electronic dies 115 may be, for example, semiconductor devices, dies, or chips that communicate with the first photonic components 107 using electrical signals. In some cases, a single electronic die 115 is incorporated into the first optical engine 300 (shown in FIG. 3). However, more than one electronic die 115 may be incorporated into the first optical engine 300 in order to reduce processing cost and/or based on the device design. The electronic dies 115 each include die connectors 125, which may be, for example, conductive pads, conductive pillars, or the like. In some embodiments, the electronic dies 115 may have a thickness between about 10 µm and about 35 µm.

The electronic dies 115 may include integrated circuits for interfacing with the first photonic components 107, such as circuits for controlling the operation of the first photonic components 107. The electronic die 115 may also include a CPU, in some embodiments. In some embodiments, the electronic dies 115 include circuits for processing electrical signals received from first photonic components 107, such as electrical signals received from the photodetector 106B. The electronic dies 115 may include controllers, drivers, transimpedance amplifiers, the like, or combinations thereof. The electronic dies 115 may control high-frequency signaling of the first photonic components 107 according to electrical signals (digital or analog) received from another device, such as from a computing package (e.g., application specific integrated circuit 401 see FIG. 4), in some embodiments. In some embodiments, the electronic dies 115 may be electronic integrated circuits (EICs) or the like that provide Serializer/Deserializer (SerDes) functionality. However, any suitable functionality may be utilized.

In some embodiments, the electronic dies 115 are bonded to the photonic die 117 by hybrid bonding. In such embodiments, covalent bonds are formed between oxide layers, such as the topmost layer of the dielectric layers 119 and surface dielectric layers (not shown) of the electronic dies 115. During the hybrid bonding, metal bonding also occurs between the die connectors 125 of the electronic dies 115 and the conductive pads 123 of the photonic die 117. By bonding the electronic dies 115 to the interconnect structure using hybrid bonding, the thickness of the resulting first optical engine 300 may be reduced, which may allow for improved electrical signal paths between the electronic dies 115, the photonic die 117, and the first photonic components 107. This arrangement may also provide for improved optical coupling between grating couplers 106A and optical fibers 413 (see FIG. 4). Additionally, the use of hybrid bonding may allow for materials transparent to the relevant wavelengths of light (e.g., silicon oxide) to be used instead of opaque materials such as an encapsulant or a molding compound. This allows the photonic die 117 and electronic dies 115 to be located above the grating couplers 106A and any other ones of the first photonic components 107 to be formed as described here. In this manner, the size or processing costs of a photonic structure may be reduced, and the optical coupling to external components may be improved.

In some embodiments, before performing the hybrid bonding process, a surface treatment is performed on the electronic dies 115. In some embodiments, the top surfaces of the photonic die 117 and/or the electronic dies 115 may first be activated utilizing, for example, a dry treatment, a wet treatment, a plasma treatment, exposure to an inert gas, exposure to $H_2$, exposure to $N_2$, exposure to $O_2$, the like, or combinations thereof. However, any suitable activation process may be utilized. After the activation process, the photonic die 117 and/or the electronic dies 115 may be cleaned using, e.g., a chemical rinse. The electronic dies 115 are then aligned with the photonic die 117 and placed into physical contact with the photonic die 117. The electronic dies 115 may be placed on the photonic die 117 using a pick-and-place process, for example. The photonic die 117 and the electronic dies 115 may then be subjected to a thermal treatment and/or pressed against each other (e.g., applying contact pressure) to hybrid bond the photonic die 117 and the electronic dies 115. For example, photonic die 117 and the electronic dies 115 may be subjected to a pressure of about 200 kPa or less, and a temperature between about 200° C. and about 400° C. The photonic die 117 and the electronic dies 115 may then be subjected to a temperature at or above the eutectic point of the material of the conductive pads 123 and the die connectors 125, e.g., between about 150° C. and about 650° C. to fuse the conductive pads 123 and the die connectors 125. In this manner, bonding of photonic die 117 and the electronic dies 115 forms a hybrid bonded structure. In some embodiments, the hybrid bonded structure is baked, annealed, pressed, or otherwise treated to strengthen or finalize the bond.

In other embodiments, the electronic dies 115 may be bonded to the photonic die 117 by direct surface bonding, metal-to-metal bonding, or another bonding process. A direct surface bonding process creates an oxide-to-oxide bond or substrate-to-substrate bond through a cleaning and/or surface activation process followed by applying pressure, heat and/or other bonding process steps to the joined surfaces. In some embodiments, the electronic dies 115 and the photonic die 117 are bonded by metal-to-metal bonding that is achieved by fusing conductive elements. Any suitable bonding process may be utilized.

Once the electronic die 115 is bonded to the photonic die 117, a second portion of the gap-fill material 127 is formed over the electronic dies 115, in accordance with some embodiments. Once deposited, the gap-fill material 127 may be planarized, in accordance with some embodiments. The planarization process may expose the electronic dies 115 such that surfaces of the electronic dies 115 and surfaces of the gap-fill material 127 are coplanar. After planarization, the gap-fill material 127 may have a thickness over the photonic die 117 that is between about 10 μm and about 40 μm, and may have a thickness over the waveguides 105 of about 20 μm. In some embodiments, the combined thickness of the passivation layer 109, the dielectric layers 119, and the gap-fill material 127 over the grating couplers 106A may be between about 14 m and about 50 μm. In some cases, a smaller combined thickness may allow for more efficient optical coupling. For example, in some embodiments, the combined thickness may be less than about 30 μm.

Once the gap-fill material 127 has been planarized, a support substrate 101 for mechanical strength may be attached to the coplanar surfaces of the electronic dies 115 and the gap-fill material 127 to provide support during further handling and processing. In an embodiment, the support substrate 101 may be attached using a fusion bonding process, such as an oxide-to-oxide fusion bonding process, or else through other processes, such as a die attach film.

a die attach film, such as an ultra-violet glue, which loses its adhesive properties when exposed to ultra-violet light. However, other types of adhesives, such as pressure sensitive adhesives, radiation curable adhesives, epoxies, combinations of these, or the like, may also be used. The adhesive may be placed onto the support substrate 101 in a semi-liquid or gel form, which is readily deformable under pressure. Once the support substrate 101 has been attached, the back side of the semiconductor substrate 103A is thinned to expose the first TIVs 111. The semiconductor substrate 103A may be thinned by a CMP process, a mechanical grinding, or the like. According to some embodiments, the semiconductor substrate 103A is thinned to a first height H1 that is less than about 25 μm, such as about 20 μm.

Figure 2:
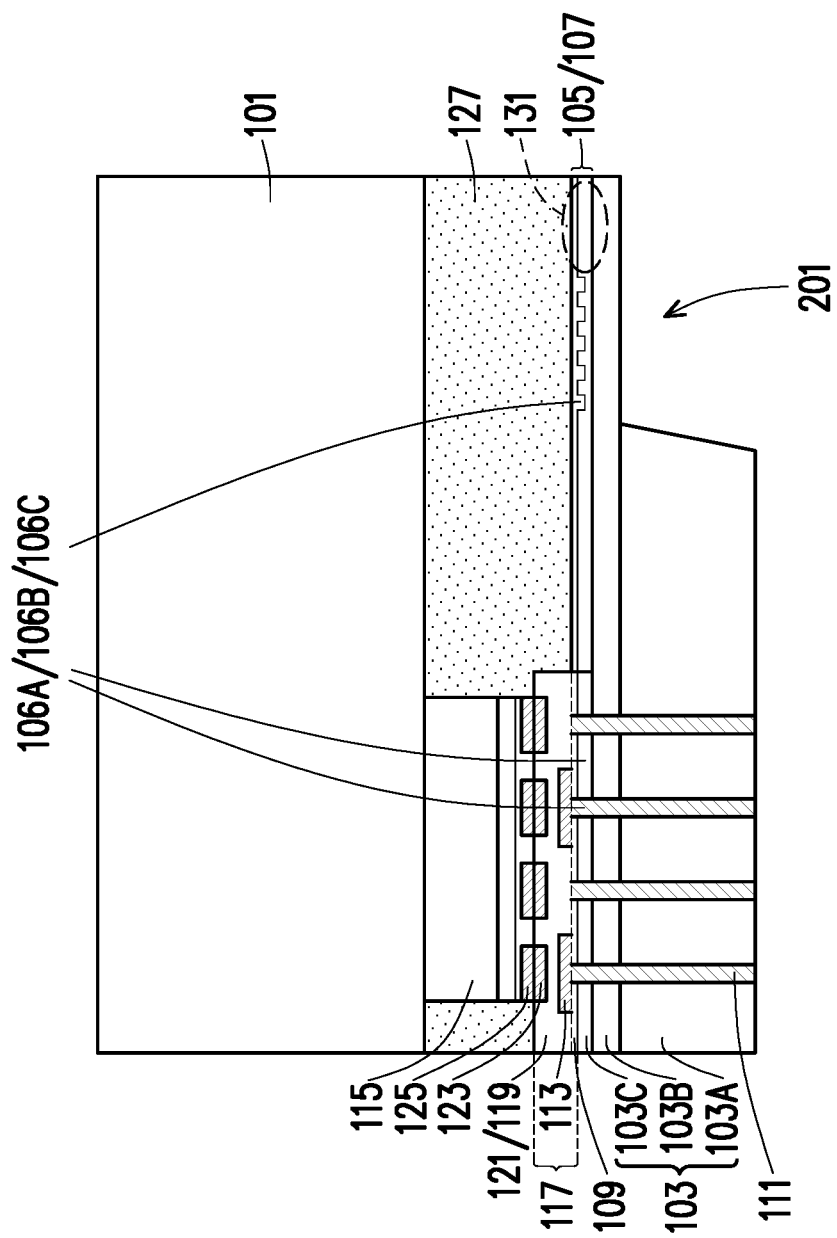

FIG. 2 illustrates a formation of a cavity 201 in the semiconductor substrate 103A, according to some embodiments. Once the semiconductor substrate 103A has been thinned, the cavity 201 may be formed through the semiconductor substrate 103A using suitable photolithography and etching techniques (e.g., backside etch process).

According to some embodiments, the cavity 201 is formed at a location under the first waveguide 105 and exposes the buried oxide layer 103B. In some embodiments, the cavity 201 may have angled sidewalls formed, for example, in a backside facet etch process. In other embodiments, the cavity 201 may have vertical sidewalls formed, for example, in an anisotropic etching process. In some embodiments, a portion of the exposed buried oxide layer 103B may extend to a location of a sidewall of the resulting first optical engine 300 (shown in FIG. 3). However, any suitable location under the first waveguide 105 may be used.

Figure 3:
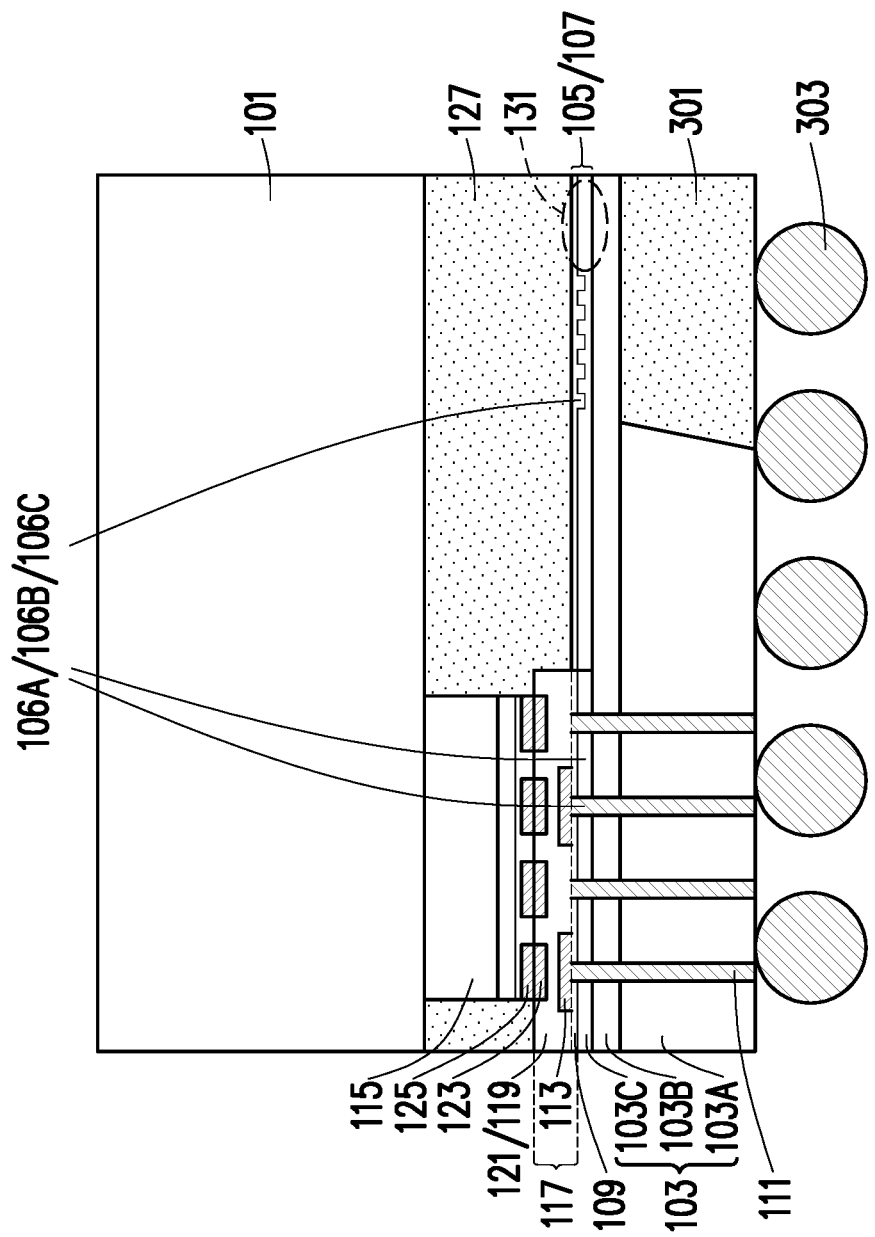

FIG. 3 illustrates a formation of a first backfill structure 301 in the cavity 201 and formation of first external contacts 303 for the first optical engine 300, according to some embodiments. The first backfill structure 301 may be formed within the cavity using any of the materials and techniques suitable for forming the gap-fill material 127. In some embodiments, the first backfill structure 301 may be formed using a silicon oxide (SiO$_2$) material in a dielectric fill process (e.g., chemical vapor deposition). However, any suitable materials and processes may be used. In some embodiments, the first backfill structure 301 is deposited to fill and/or overfill the cavity 201. Once deposited, the first backfill structure 301 is planarized with the coplanar surface of the semiconductor substrate 103A and first TIVs 111 using a process such as chemical mechanical planarization. In other embodiments, the first backfill structure 301 may be formed using a molding material (e.g., molding compound, epoxy, or the like) in a molding process, such as, injection molding or the like. However, any suitable material and method may be utilized. The first backfill structure 301 may also be referred to herein as a first oxide substrate structure, an oxide substrate structure, a first oxide structure, or oxide structure.

By forming the first backfill structure 301 during the front end fabrication processes, materials more suitable for front end fabrication processes can be utilized. For example, the first backfill structure 301 may be formed with silicon oxide or other oxides instead of organic materials which are more associated with package fabrication processes. As such, the problems associated with package fabrication materials such as the organic materials, may be avoided.

Once the first backfill structure 301 has been formed (e.g., in the front end fabrication processes), first external contacts 303 are formed electrically coupled to the first TIVs 111 as external connection to the first optical engine 300. In some embodiments, in these package fabrication processes, conductive pads may be formed on the first TIVs 111 exposed at the coplanar surface of the semiconductor substrate 103A. The conductive pads may be, for example, aluminum pads or aluminum-copper pads, although other metallic pads also may be used. In some embodiments, a passivation film may be formed on the semiconductor substrate 103A, covering the conductive pads. The passivation film may be formed from a dielectric material, such as silicon oxide, silicon nitride, the like, or combinations thereof. Openings may be formed through the passivation film to expose central portions of the conductive pads. A process such as electroplating may be used to form underbump metallizations (UBMs) to the conductive pads and over the passivation film, in some embodiments. The UBMs may be formed from copper, a copper alloy, silver, gold, aluminum, nickel, the like, or combinations thereof. Once the UBMs have been formed, the first external contacts 303 may be attached to the UBMs.

According to some embodiments, the first external contacts 303 may be controlled collapse chip connection (C4) bumps, ball grid array (BGA) connectors, solder balls, metal pillars, micro bumps, electroless nickel-electroless palladium-immersion gold technique (ENEPIG) formed bumps, or the like. The first external contacts 303 may include a conductive material such as solder, copper, aluminum, gold, nickel, silver, palladium, tin, the like, or a combination thereof. In some embodiments, the first external contacts 303 are formed by initially forming a layer of solder through methods such as evaporation, electroplating, printing, solder transfer, ball placement, or the like. Once a layer of solder has been formed on the structure, a reflow may be performed in order to shape the material into the desired bump shapes. In another embodiment, the first external contacts 303 are metal pillars (such as a copper pillar) formed by a sputtering, printing, electro plating, electroless plating, CVD, or the like. The metal pillars may be solder free and have substantially vertical sidewalls. In some embodiments, a metal cap layer (not shown) is formed on the top of the first external contacts 303. The metal cap layer may include nickel, tin, tin-lead, gold, silver, palladium, indium, nickel-palladium-gold, nickel-gold, the like, or a combination thereof and may be formed by a plating process.

Further, by packaging the first optical engine 300 using the backside etch process to form the cavity 201, a dielectric fill process to form the first backfill structure 301, and a planarization process (e.g., CMP) to planarize the first backfill structure 301, this enables a robust structure and simpler manufacturing process for packaging the first optical engine 300. Using oxide type materials to form the first optical engine 300 allows for much of the manufacturing process to be performed in front end of the line (FEOL) fabrication facilities. As such, greater processing control and improved optical integrity is maintained for the fabrication of the first optical engine 300. Furthermore, the first optical engine 300 is modularized in a stand-alone package that can achieve good die to die bandwidths by reducing the pitches of the conductive feature 121, the dielectric layers 119, and the conductive pads 123 of the photonic die 117 and the first TIVs 111. As such, the first optical engine 300 formed in the stand alone package can be quickly installed as desired with other packages or even co-packaged with other packages allowing for the first optical engine 300 to be used and incorporated in a wide variety of uses with a minimum or re-design.

Figure 4:
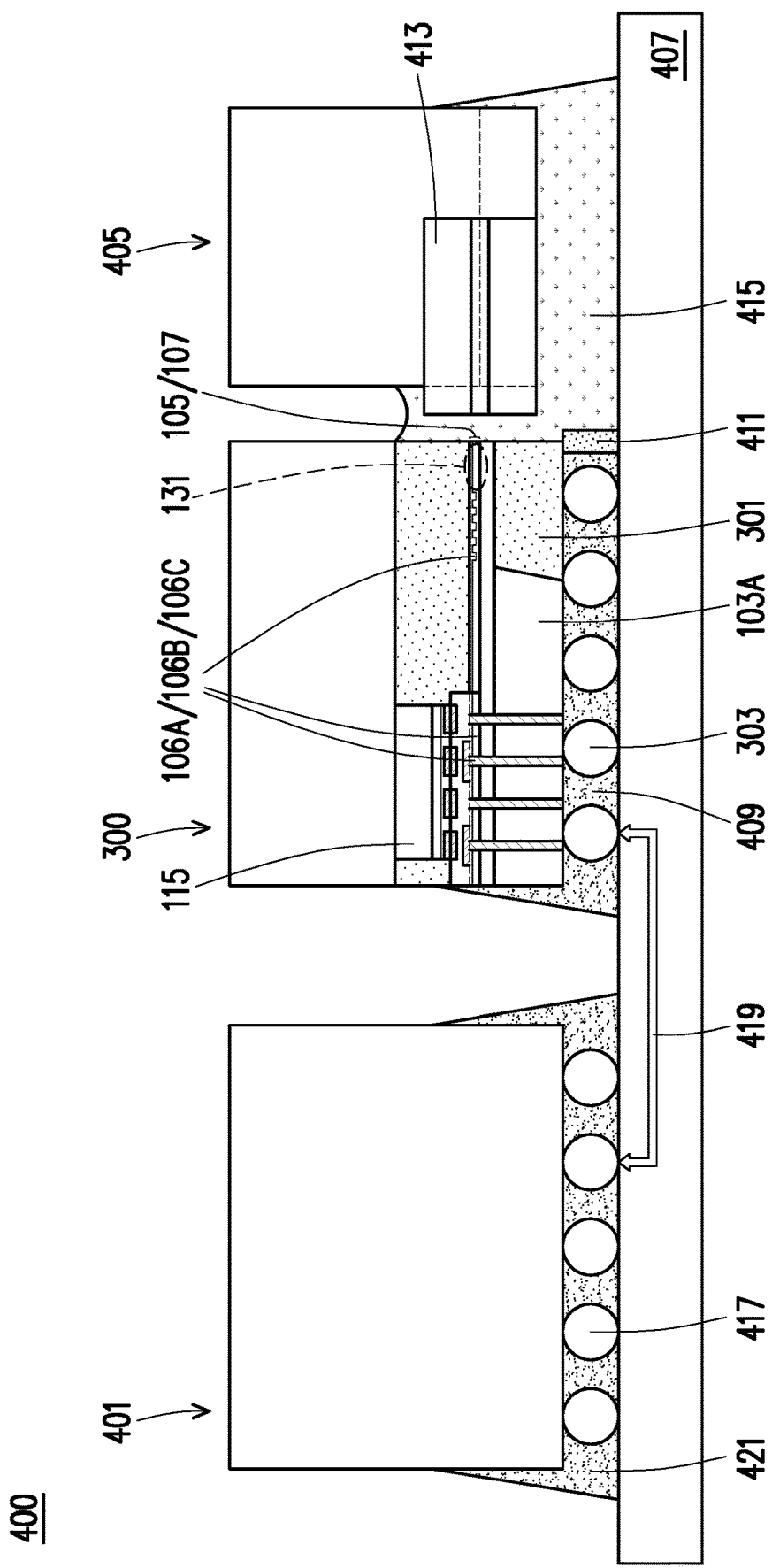
FIG. 4 illustrates a first package assembly using the first optical engine, according to some embodiments.

FIG. 4 illustrates a first package assembly 400, according to some embodiments. The first package assembly 400 comprises the first optical engine 300, a first semiconductor die 401, a fiber attachment unit 405 and a package substrate 407, in accordance with some embodiments.

The first optical engine 300 may be bonded to the package substrate 407 using the first external contacts 303. In an embodiment the package substrate 407 may be a printed circuit board such as a laminate substrate formed as a stack of multiple thin layers (or laminates) of a polymer material such as bismaleimide triazine (BT), FR-4, ABF, or the like. However, any other suitable substrate, such as a silicon interposer, a silicon substrate, organic substrate, a ceramic substrate, or the like, may alternatively be utilized, and all such redistributive substrates that provide support and connectivity to the first external contacts 303 are fully intended to be included within the scope of the embodiments. The first optical engine 300 may be bonded to the package substrate 407 using, for example, a pick-and-place process to arrange the first optical engine 300 over the package substrate 407. Once arranged, the first optical engine 300 is electrically coupled to the package substrate 407 for example by performing a suitable bonding process such as a solder reflow process to bond the first external contacts 303 of the first optical engine 300 to conductive contacts of the package substrate 407. However, any suitable bonding process may be utilized.

In some embodiments, an optional spacer 411 may be used to control the placement and bonding of the first optical engine 300 to the package substrate 407. For example, the optional spacer 411 may control a distance the first optical engine 300 is arranged from package substrate 407. The optional spacer 411 may be formed using any of the dielectric materials and processes suitable to forming the first backfill structure 301. However, any suitable dielectric materials and techniques may be used to form the optional spacer 411. According to some embodiments, the optional spacer 411 is formed to the first optical engine 300 prior to bonding the first optical engine 300 to the package substrate 407. In embodiments in which molding materials and techniques are used to form the first backfill structure 301, the optional spacer 411 may be formed as an extension of the first backfill structure 301 during molding. In still other embodiments, the optional spacer 411 may be attached to the package substrate 407 prior to bonding the first optical engine 300 to the package substrate 407. In such cases, the optional spacer 411 may be attached using any suitable materials such as adhesives, adhesive tapes, thermal interface materials (TIM), dielectric or the like and using suitable techniques such as pick-and-place, material extruding, material printing process, photolithography and etching techniques, combinations or the like.

An optional first underfill 409 may be placed between the first optical engine 300 and the package substrate 407, in accordance with some embodiments. The optional first underfill 409 is a protective material used to cushion and support the first optical engine 300 and the package substrate 407 from operational and environmental degradation, such as stresses caused by the generation of heat during operation. The optional first underfill 409 may be injected or otherwise formed in the space between the first optical engine 300 and the package substrate 407 and may, for example, comprise a liquid epoxy that is dispensed between the first optical engine 300 and the package substrate 407 and then cured to harden. In some embodiments, the optional spacer 411 may be used to control the flow of the optional first underfill 409 during placement.

FIG. 4 further illustrates the attachment of the fiber attachment unit 405 (e.g., fiber holder) to the package substrate 407. In particular, the first package assembly 400 described herein allows for optical communication with an optical fiber 413 mounted to the fiber attachment unit 405. In some embodiments, the optical fiber may be mounted from the side of the fiber attachment unit 405 (e.g., in a "horizontal" orientation or "edge coupler" arrangement). In other embodiments, the optical fiber may be mounted from above the fiber attachment unit 405 (e.g., in a "vertical" orientation). The fiber attachment unit 405 may be mounted using a transparent adhesive 415 (e.g., optical glue, epoxy, optical underfill, combinations, or the like). In an active alignment process, the fiber attachment unit 405 is positioned (e.g., using a pick-and-place process) while optical signals are transmitted by the optical fiber 413 to the first optical engine 300 during placement and hardening of the transparent adhesive 415. For example, optical signals may be transmitted from the optical fiber 413 through the transparent adhesive 415 to the grating coupler 106A (e.g., edge coupler) and into the first waveguides 105, wherein the optical signals may be detected by a photodetector 106B and transmitted as electrical signals into the electronic die 115. During operation, the backfill structure 301 reduces optical loss due to any overlapping of the optical signals with the bulk silicon of the semiconductor substrate 103A. The electronic die 115 may provide indication of proper alignment, for example to a controller for the pick-and-place process, to ensure the fiber attachment unit 405 maintains proper alignment during the placement and hardening of the transparent adhesive 415. For embodiments in which the fiber attachment unit 405 is placed adjacent the first optical engine 300 in an edge coupler arrangement, the edge coupler arrangement may allow for improved optical coupling, reduced processing cost, or greater design flexibility. In some embodiments, the photonic packages 100 described herein could be considered system-on-chip (SoC) or system-on-integrated-circuit (SoIC) devices.

FIG. 4 additionally illustrates the placement of the first semiconductor die 401 onto the package substrate 407 adjacent the first optical engine 300. As such, the first semiconductor die 401 is electrically coupled through conductive features (e.g., microbumps, conductive traces, conductive vias, copper traces, combinations, or the like) of the package substrate 407. In some embodiments, the first semiconductor die 401 is designed to work cooperatively with the first optical engine 300 (as indicated by the directional arrow 419) to perform a desired function. The first semiconductor die 401 may be, for example, an application specific integrated circuit (ASIC) die, a logic die, a memory die, or the like. In some embodiments, the first semiconductor die 401 may be a packaged device comprising other semiconductor dies and each of the semiconductor dies may be designed to work cooperatively with the first optical engine 300 and/or with one another. In some embodiments, other semiconductor dies and/or packaged devices may be attached to the package substrate 407. In such embodiments, the other semiconductor dies and/or packaged devices may be designed to work cooperatively with the first optical engine 300 and/or with the first semiconductor die 401.

For example, in embodiments in which the first semiconductor die 401 and/or other semiconductor dies are logic devices, the first semiconductor die 401 may be a device such as central processing units (CPU), graphics processing unit (GPU), system-on-a-chip (SoC) devices, application processor (AP) devices, microcontrollers, or the like. Additionally, in embodiments in which the first semiconductor die 401 and/or other semiconductor dies are memory devices, these semiconductor dies may be, e.g., a dynamic random access memory (DRAM) die, static random access memory (SRAM) die, hybrid memory cube (HMC) device, high bandwidth memory (HBM) device, or the like. However, any suitable functionality, defined by any suitable structures, is fully intended to be included within the scope of the embodiments.

In an embodiment both of the first semiconductor die 401 and/or the other semiconductor dies may further comprise die contact pads, die passivation layers, die protection layers, and second external contacts 417. The second external contacts 417 may be any of the contact structures suitable for forming the first external contacts 303 of the first optical engine 300, as described above. In an embodiment, the second external contacts 417 may be controlled collapse chip connection (C4) bumps. However, any suitable structures may be utilized. Furthermore, the first semiconductor die 401 and/or the other semiconductor dies may be mounted to the package substrate 407 using any of the materials and techniques used to mount the first optical engine 300. Once mounted, an optional second underfill 421 may be deposited between the package substrate 407 and the first semiconductor die 401 and/or between the package substrate 407 and the other semiconductor dies. The optional second underfill 421 may be placed using any of the materials and techniques used to place the optional first underfill 409, as set forth above.

Figure 5:
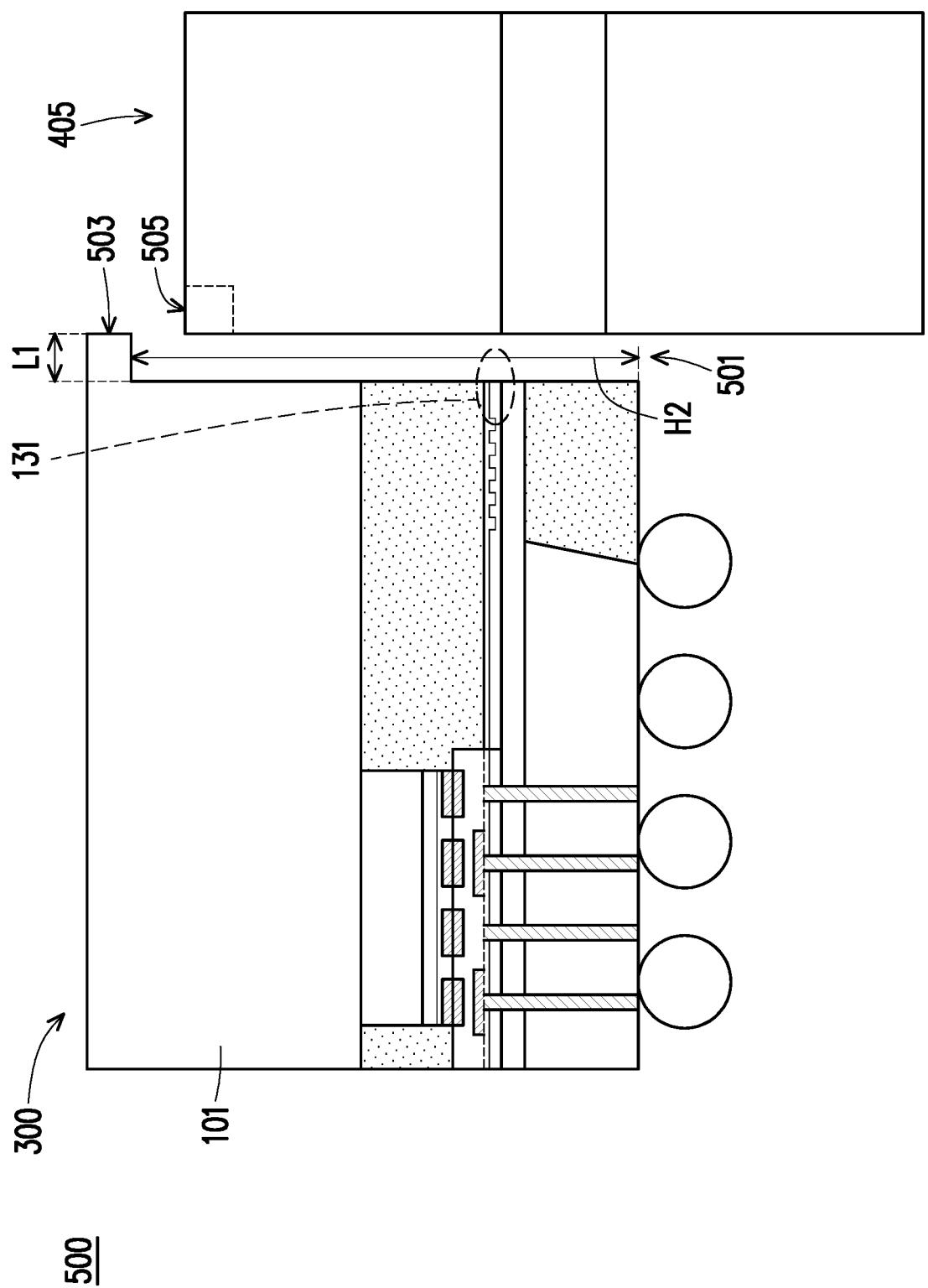
FIG. 5 illustrates formation of an optional groove feature in the first optical engine for passive alignment with a fiber attachment unit, according to some embodiments.

FIG. 5 illustrates the first optical engine 300 and the fiber attachment unit 405 comprising an optional feature that allows for passive alignment of the first optical engine 300 and the fiber attachment unit 405 in a co-packaged arrangement 500, according to some embodiments. In particular, FIG. 5 illustrates the first optical engine 300 being aligned and attached to the fiber attachment unit 405 in the co-packaged arrangement 500. As such, the first optical engine 300 and the fiber attachment unit 405 are passively aligned and the co-packaged arrangement 500 may be mounted to the package substrate 407 prior to attaching and actively conducting the optical fiber 413.

FIG. 5 further illustrates the first optical engine 300 comprising an alignment groove 501 and an alignment tab 503, according to some embodiments. In some embodiments, the alignment groove 501 may be formed during a final facet etch process used to form the cavity 201. The alignment groove 501 may be formed using acceptable photolithography and etching techniques to remove materials of the semiconductor substrate 103A, the buried oxide layer 103B, the patterned silicon layer 103C, the gap-fill material 127, and the support substrate 101. In other embodiments, the alignment groove 501 may be formed after the formation of the first backfill structure 301 using acceptable photolithography and etching techniques to remove materials of the first backfill structure 301 along with the other materials of the first optical engine 300. However, still other techniques such as laser-drilling, wafer sawing, combinations or the like may also be utilized. In some embodiments, the alignment groove 501 is formed to a second height H2 of about 60,000 nm. However, any suitable height may be used. A portion of the support substrate 101 that remains after removing materials from the alignment groove 501 forms the alignment tab 503. According to some embodiments, the alignment tab 503 may have a first length of Li of between about 1,000 nm and about 10,000 nm. The alignment tab 503 may be V-shaped, U-shaped, square-shaped, or the like. However, any suitable length, size, and shape may be used.

FIG. 5 further illustrates the fiber attachment unit 405 comprising an alignment notch 505 corresponding to the alignment tab 503 of the first optical engine 300, according to some embodiments. In embodiments where the fiber attachment unit 405 is formed using a molding compound, the alignment notch 505 may be formed during the molding process used to form the fiber attachment unit 405. In embodiments where the fiber attachment unit 405 is formed using a dielectric materials, the alignment notch 505 may be formed using any suitable photolithography and etching techniques to recess the materials of the fiber attachment unit 405. The alignment notch 505 is formed to a shape acceptable for receiving the alignment tab 503. In some embodiments, the fiber attachment unit 405 and the first optical engine 300 may be assembled and passively aligned using the alignment groove 501, the alignment tab 503, and the alignment notch 505 to form the co-packaged arrangement 500. In some embodiments, a snap-to-fit configuration may be used to fix the fiber attachment unit 405 to the first optical engine 300. However, any suitable configuration may be used. Furthermore, other suitable mechanism (e.g., adhesives, thermal interface materials (TIM), combinations, or the like) may be used to fix the fiber attachment unit 405 to the first optical engine 300 in passive alignment, and all such configurations and/or mechanisms that fix the fiber attachment unit 405 to the first optical engine 300 are fully intended to be included within the scope of the embodiments.

Figure 6:
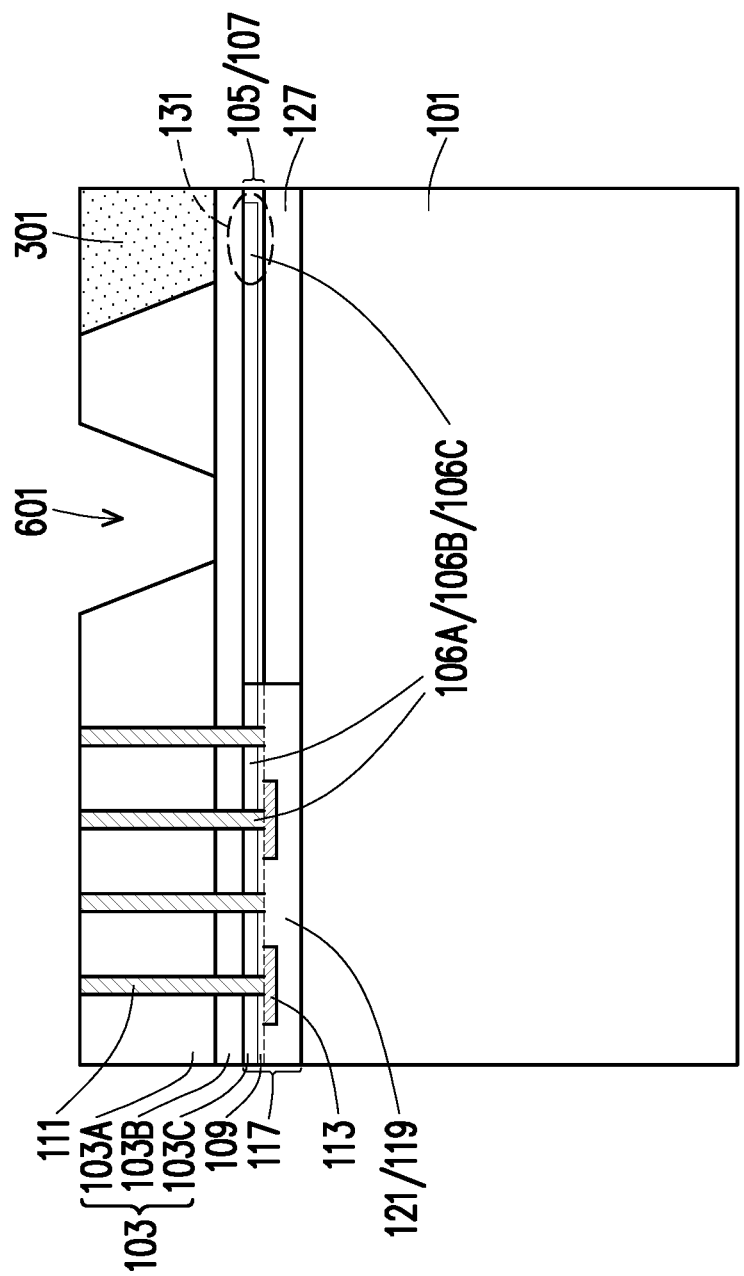
FIGS. 6-8 illustrate formation of a second optical engine and second package assembly, according to some embodiments.
Figure 7:
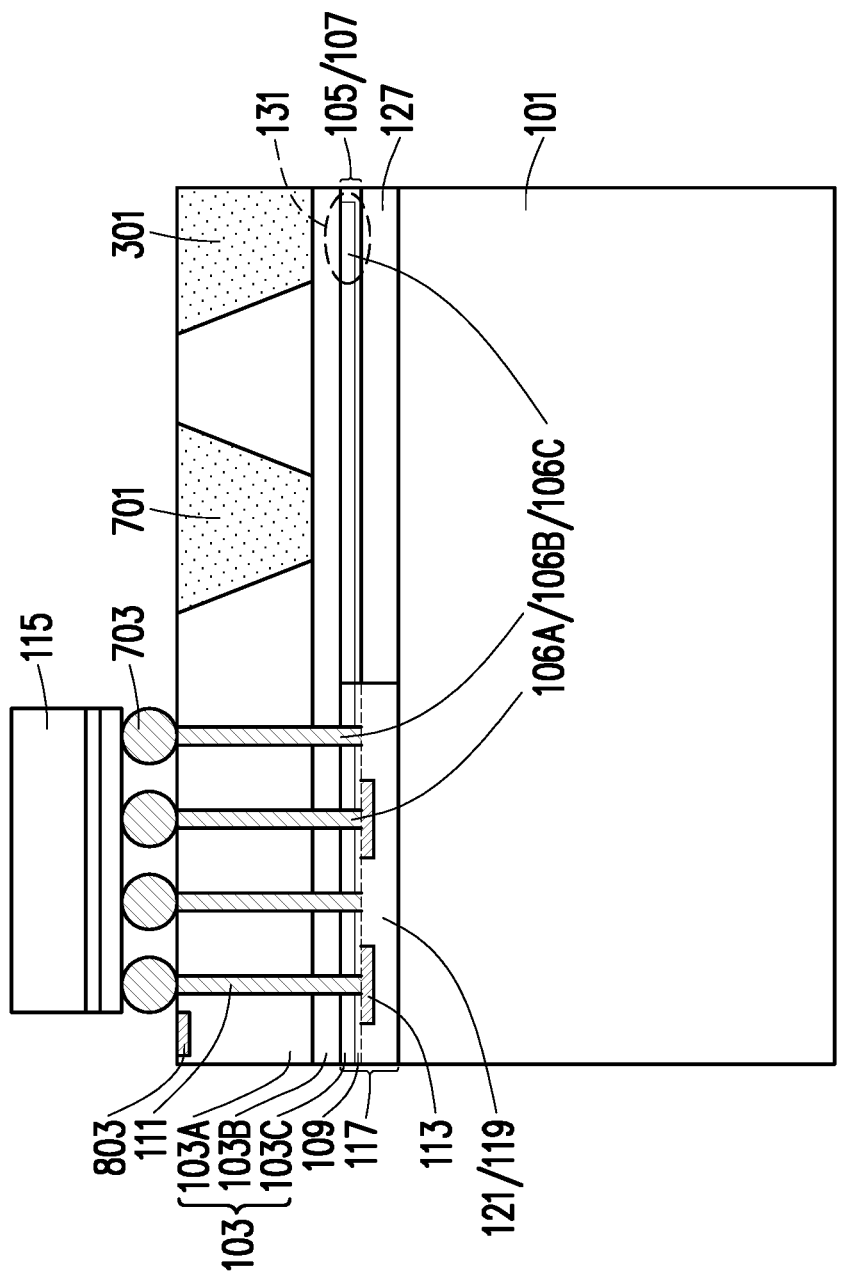
Figure 8:
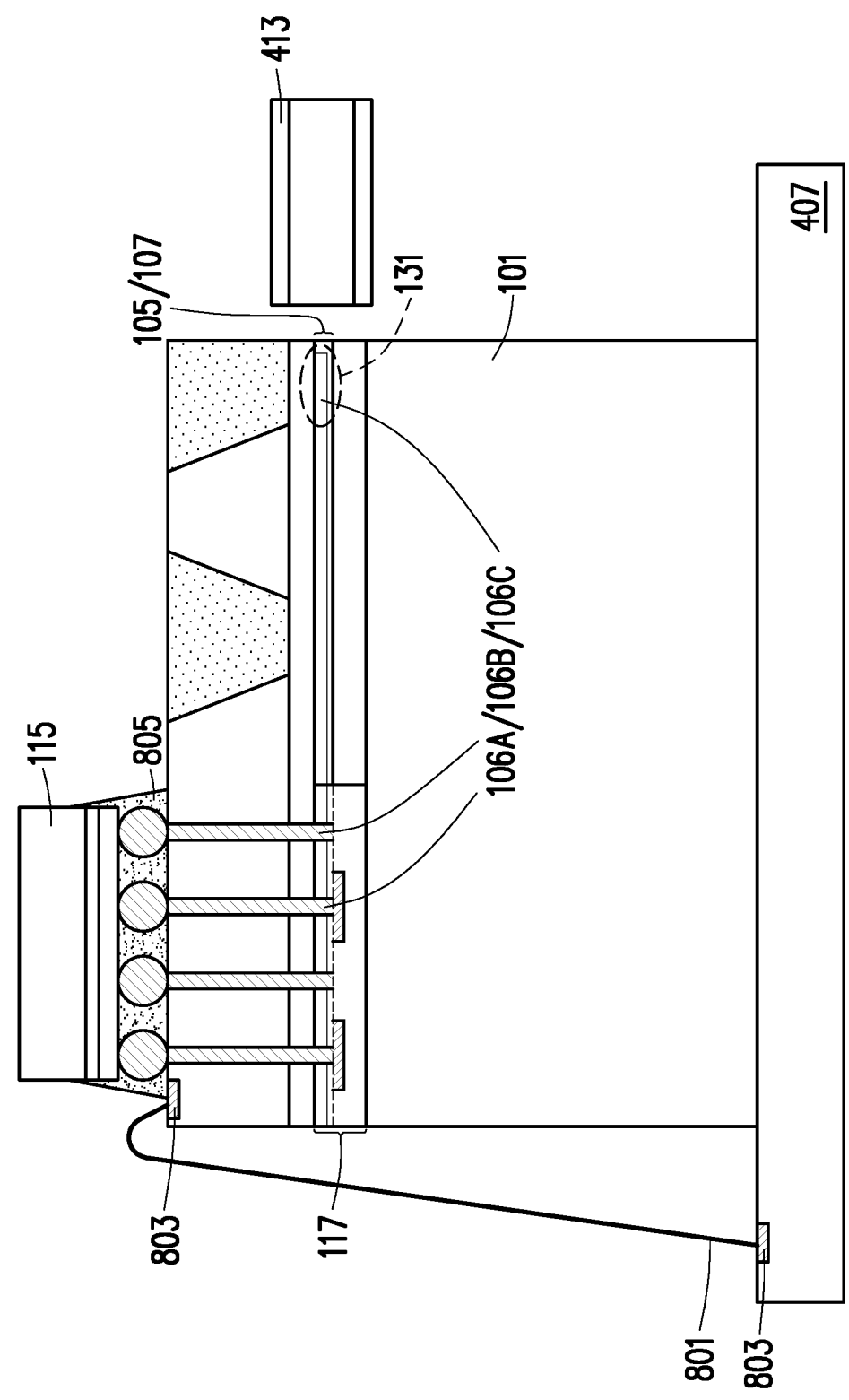

FIGS. 6-8 illustrate another embodiment of a second optical engine 700 similar to the first optical engine 300, but which utilizes a second backfill structure 701 along with the first backfill structure 301. In this embodiment, and as illustrated in FIG. 6, a second cavity 601 is formed within the BOX substrate 103 adjacent to the first backfill structure 301. The second cavity 601 may be formed using any of the materials and techniques to form the cavity 201, as set forth above.

According to some embodiments, the second cavity 601 is formed in a location along the semiconductor substrate 103A corresponding to electrical components that may be susceptible to electrical leakage during operation (e.g., high bandwidth memory devices, processors, and the like). In other embodiments, the second cavity 601 is formed along the semiconductor substrate 103A corresponding to regions of the second optical engine 700 that may be exposed to undesirable levels of heat during operation (e.g., location for a heat sink, location of thermal hot spots, or the like).

FIG. 7 illustrates the second optical engine 700 after formation of the second backfill structure 701 and attachment of the electronic die 115, according to some embodiments. In particular, once the second cavity 601 has been formed, a suitable backfill material (e.g., dielectric materials, electrical insulators, thermal insulators, thermal conductors, or the like) may be formed within the second cavity 601 using a suitable technique (e.g., chemical vapor deposition (CVD)). Once deposited, the second backfill structure 701 is formed by planarizing the backfill material with the semiconductor substrate 103A and the first backfill structure 301.

For embodiments in which the second cavity 601 is formed in a location corresponding to electrical components, the second cavity 601 may be filled and/or overfilled with a suitable dielectric material. Suitable dielectric materials may include, but are not limited to, electrical insulators, refill oxide materials (e.g., silicon oxide), combinations, or the like. As such, susceptibility to electrical leakage during operation is reduced by the second backfill structure 701 as compared to the susceptibility to electrical leakage of the semiconductor substrate 103A alone.

For embodiments in which the second cavity 601 is formed in a location corresponding to regions exposed to undesirable levels of heat, the second cavity 601 may be filled and/or overfilled with a suitable thermal fill material (e.g., thermal insulators, thermal conductors, or the like). In embodiments where regions of the semiconductor substrate 103A are desired to prevent heat from passing to the second optical engine 700 during operation (e.g., a location corresponding to a thermal hotspot associated with a processing device arranged adjacent the second optical engine 700), a thermal insulator may be used as the thermal fill material. As such, the efficiency of heat transfer is reduced by the second backfill structure 701 as compared to the efficiency of heat transfer of the semiconductor substrate 103A alone. In embodiments where a region of the semiconductor substrate 103A is desired to draw heat away from the second optical engine 700 during operation (e.g., a location intended for a heat sink), a thermal conductor may be used for the thermal fill material. As such, the efficiency of heat transfer is increased by the second backfill structure 701 as compared to the efficiency of heat transfer of the semiconductor substrate 103A alone.

Although only one optional second backfill structure 701 is illustrated, any suitable number of the optional second backfill structures 603 may be utilized. In some embodiments, different types of materials may be used for the optional second backfill structures 603. For example, dielectric materials may be used to form one or more of the optional second backfill structures 603 and thermally conductive (and/or thermally insulating) materials may be used to form the remaining optional second backfill structures 603. However, in still other embodiments, the materials used to form the optional second backfill structures 603 may be the same.

FIG. 7 further illustrates the attachment of the electronic die 115 to the first TIVs 111, according to some embodiments. The second optical engine 700 is similar to the first optical engine 300 except the electronic die 115 is mounted to a front-side of the second optical engine 700 and is electrically coupled to the photonic die 117 by the first TIVs 111. In such embodiments, the electronic die 115 is mounted to the device after the backside processing to form the first backfill structure 301 and may be referred to herein as an E-die last process.

In such an E-die last processes, the electronic die 115 may be equipped with third external contacts 703. The third external contacts 703 may be formed using any of the materials and/or techniques suitable for the first external contacts 303, set forth above. According to some embodiments, the third external contacts 703 are formed as microbumps. However, any other suitable contacts (e.g., controlled collapse chip connection (C4) bumps) may be utilized. As such, the electronic die 115 may comprise a passivation film, conductive pads 123, and underbump metallizations (UBMs) for external connection. According to some embodiments, the third external contacts 703 are formed over the UBMs of the electronic die 115. In other embodiments, the third external contacts 703 are formed over the UBMs of the first TIVs 111. Once the third external contacts 703 have been formed, the electronic die 115 is placed (e.g., by a pick-n-place process) over the semiconductor substrate 103A and bonded to the first TIVs 111 using a suitable bonding process (e.g., solder reflow process). However, any suitable placement and bonding processes may be used.

FIG. 7 further illustrates the formation of optional bond pads 803 at the surface of the semiconductor substrate 103A and at the surface of the package substrate 407, according to some embodiments. The optional bond pads 803 may be formed to provide an electrical connection between the second optical engine 700 and a subsequently mounted package substrate 407 (not illustrated in FIG. 7 but illustrated and described below with respect to FIG. 8). In an embodiment the optional bond pads 803 are formed of a conductive material such as aluminum, although other suitable materials, such as copper, tungsten, or the like, may be utilized. The optional bond pads 803 may be formed using a process such as CVD or PVD, although other suitable materials and methods may be utilized. Once the material for the optional bond pads 803 has been deposited, the material may be shaped into the optional bond pads 803 using, e.g., a photolithographic masking and etching process. Furthermore, conductive traces and/or conductive features may be formed with the optional bond pads 803 to electrically couple to the third external contacts 703 and/or first TIVs 111 of the second optical engine 700.

FIG. 8 illustrates a second package assembly 800, according to some embodiments. The second package assembly 800 comprises the second optical engine 700, a wire bond 801, and the package substrate 407, in accordance with some embodiments.

The second optical engine 700 may be mounted to the package substrate 407 using a backside bonding process to attach the support substrate 101 to the surface of the package substrate 407, in accordance with some embodiments. In some embodiments, the second optical engine 700 may be bonded using a suitable bonding material (e.g., adhesives, silicon-to-silicon bonding, combinations, or the like). However, any suitable bonding material and techniques may be used.

Once the second optical engine 700 has been mounted, an optional third underfill material 805 may be placed between the electronic die 115 and the semiconductor substrate 103A. The optional third underfill material 805 may be placed using any of the materials and techniques used to place the optional first underfill 409, as set forth above.

The wire bonds 801 are attached to electrically couple the second optical engine 700 and the package substrate 407. In some embodiments, the wire bonds 801 are attached between bond pads 803 of the semiconductor substrate 103A and bond pads 803 of the package substrate 407. In an embodiment, an electronic flame off (EFO) wand may be used to raise the temperature of a gold wire (not individually illustrated in FIG. 8) within a capillary controlled by a wire clamp (also not individually illustrated in FIG. 8). Once the temperature of the gold wire is raised to between about 150° C. and about 250° C., the gold wire is contacted to a bond pad 803 of the semiconductor substrate 103A to form a first connection and then the gold wire is moved to a bond pad 803 of the package substrate 407 to form a second connection. Once connected, the remainder of the gold wire is separated from the connected portions to form the wire bonds 80i. The connection process may be repeated to form as many connections as desired. As such, the wire bonds 801 may provide signal and power from the package substrate 407 to the second optical engine 700 during operation.

FIG. 8 further illustrates attachment of the optical fiber 413 in an edge coupling configuration with the second optical engine 700, in accordance with some embodiments. The optical fiber 413 may be aligned and attached to the second optical engine 700 using the fiber attachment unit 405 in any of the active alignment processes or any of the passive alignment processes, as discussed above.

Figure 9:
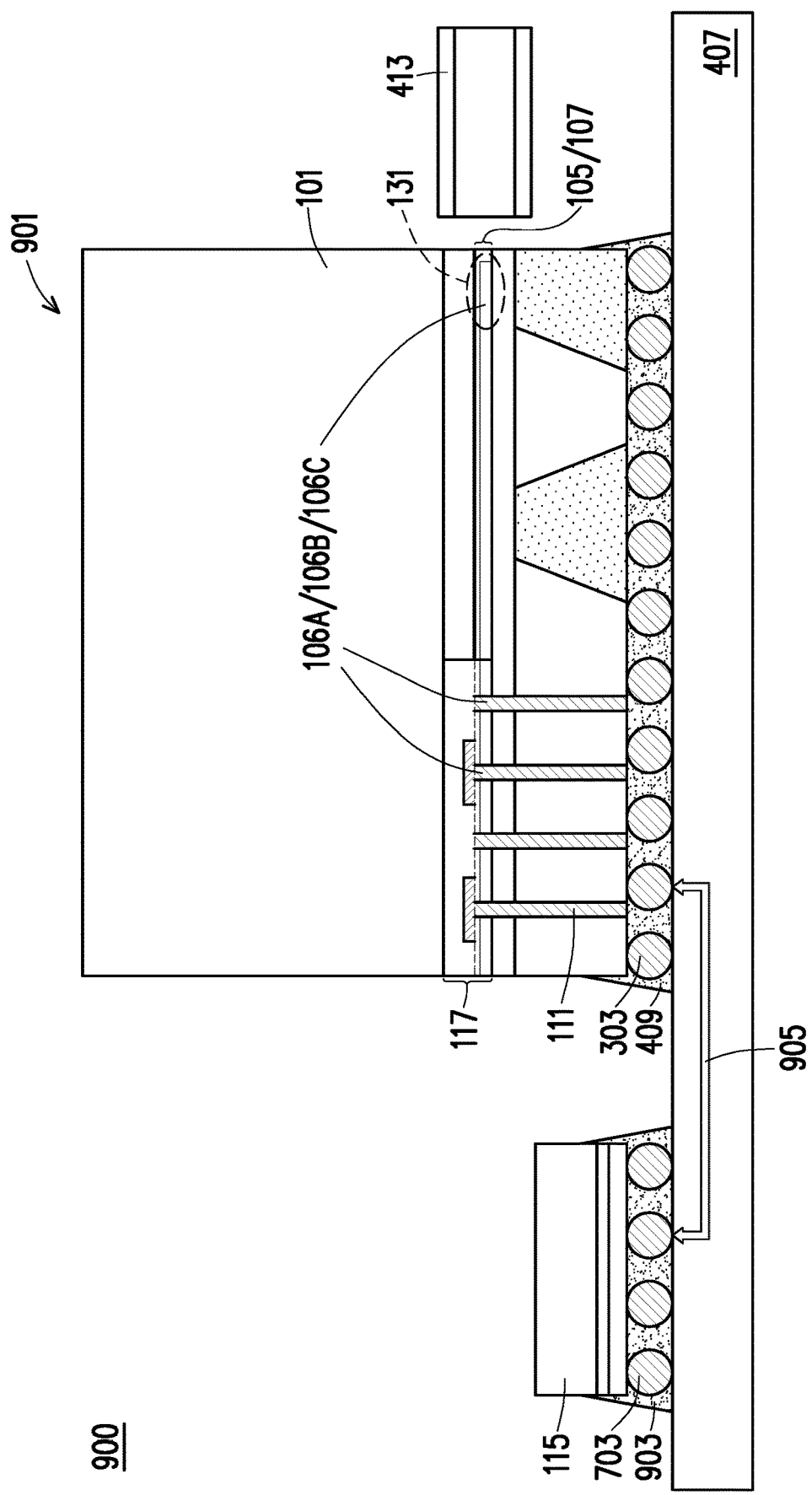
FIG. 9 illustrates a third package assembly using a third optical engine, according to some embodiments.

FIG. 9 illustrates a third package assembly 900, according to some embodiments. The third package assembly 900 comprises a third optical engine 901, the electronic die 115, and the package substrate 407, in accordance with some embodiments. The third optical engine 901 is similar to the second optical engine 700 (shown in FIG. 7) except the electronic die 115 is separate from the third optical engine 901 and the third optical engine 901 is mounted to the package substrate 407 in a front-side mounting process. Instead of being attached to the front-side of the third optical engine 901, the electronic die 115 is mounted to the package substrate 407.

According to some embodiments, the third optical engine 901 is mounted to the package substrate 407 using the first external contacts 303, as set forth above. As such, the photonic die 117 is electrically coupled to the package substrate 407 by the first TIVs 111. Once the third optical engine 901 has been mounted, the optional first underfill 409 may be placed between the third optical engine 901 and the package substrate 407, in accordance with some embodiments.

In accordance with some embodiments, the electronic die 115 may be mounted to the package substrate 407 using any of the contacts suitable for forming the third external contacts 703 as set forth above. In some embodiments, the contacts used to mount the electronic die 115 to the package substrate 407 are similar to the first external contacts 303 used to mount the third optical engine 901 to the package substrate 407. As such, the electronic die 115 is electrically coupled to and cooperates with the photonic die 117 through the conductive features on the package substrate 407 (as indicated by the first directional arrow 905).

Once the electronic die 115 has been mounted, an optional fourth underfill material 903 may be placed between the electronic die 115 and the package substrate 407. The optional fourth underfill material 903 may be placed using any of the materials and techniques used to place the optional first underfill 409, as set forth above.

FIG. 9 further illustrates attachment of the optical fiber 413 in an edge coupling configuration with the third optical engine 901, in accordance with some embodiments. The optical fiber 413 may be aligned and attached to the third optical engine 901 using the fiber attachment unit 405 in any of the active alignment processes or any of the passive alignment processes, as discussed above.

According to some embodiments, the first semiconductor die 401 (not separately illustrated in FIG. 9) may be mounted to the package substrate 407 as set forth above. As such, the first semiconductor die 401 may be designed to cooperatively work with and may be electrically coupled to the third optical engine 901 and/or the electronic die 115.

Figure 10:
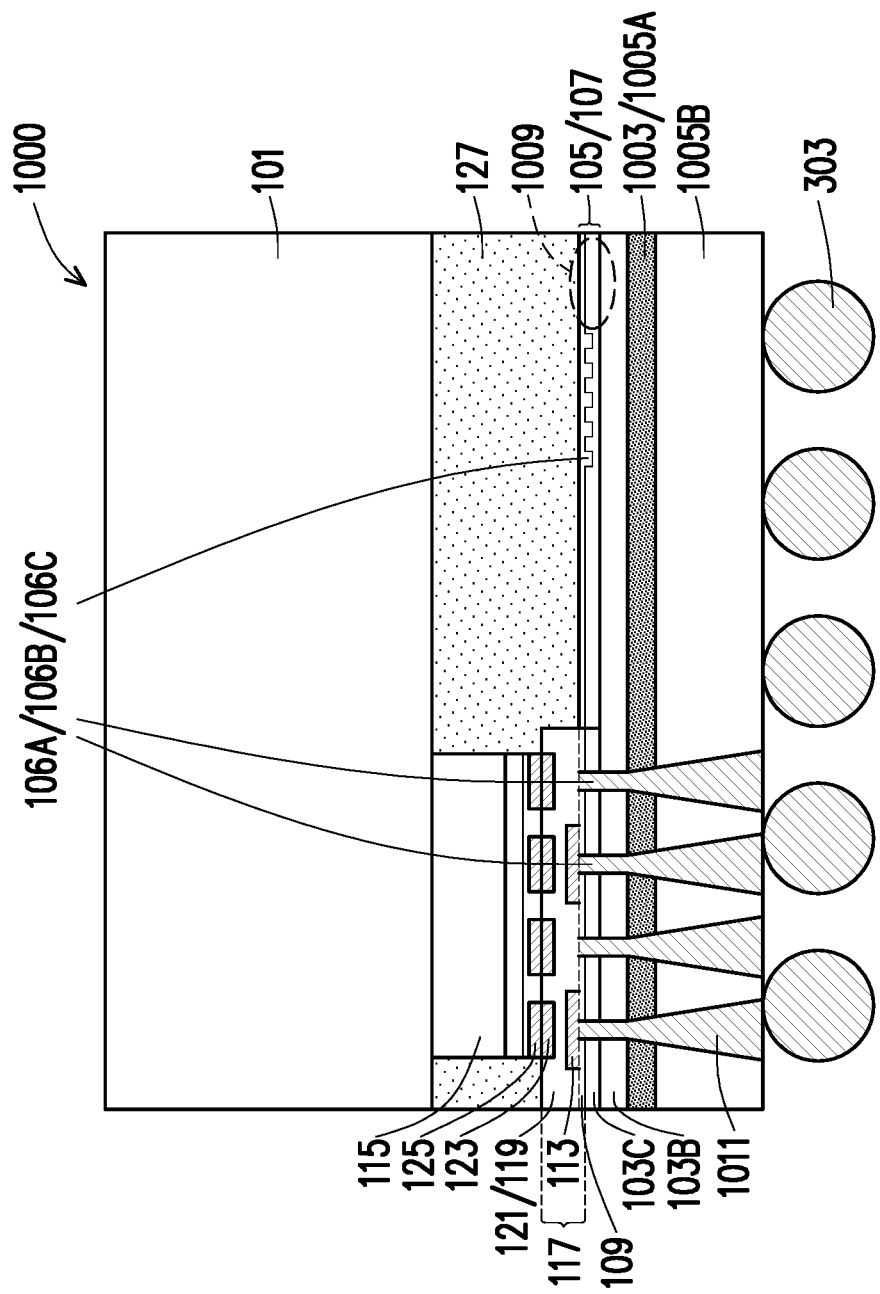
FIGS. 10-13 illustrate formation of a fourth optical engine, according to yet some further embodiments.

FIG. 10 illustrates a fourth optical engine 1000, according to yet some further embodiments. The fourth optical engine 1000 is similar to the first optical engine 300 (shown in FIG. 3) except the fourth optical engine 1000 comprises second waveguides 1003 and a front side protection layer 1005 instead of the semiconductor substrate 103A, according to some embodiments.

FIG. 10 further illustrates a third region 1009 of the fourth optical engine 1000 that is highlighted by a dashed circle. The third region 1009 may be referred to herein as the silicon tip of the first waveguides 105 and the second waveguides 1003. The third region 1009 may provide a location at which optical communication can be conducted through the first waveguides 105 and the second waveguides 1003 during operation of the fourth optical engine 1000, according to some embodiments.

FIG. 10 further illustrates second TIVs 1011 that extend through the second waveguide 1003 and the front side protection layer 1005, in accordance with some embodiments. The first external contacts 303 may be formed to the second TIVs 1011 using any of the materials and techniques suitable for attaching the first external contacts 303 to the first TIVs 111, as set forth above.

Figure 11:
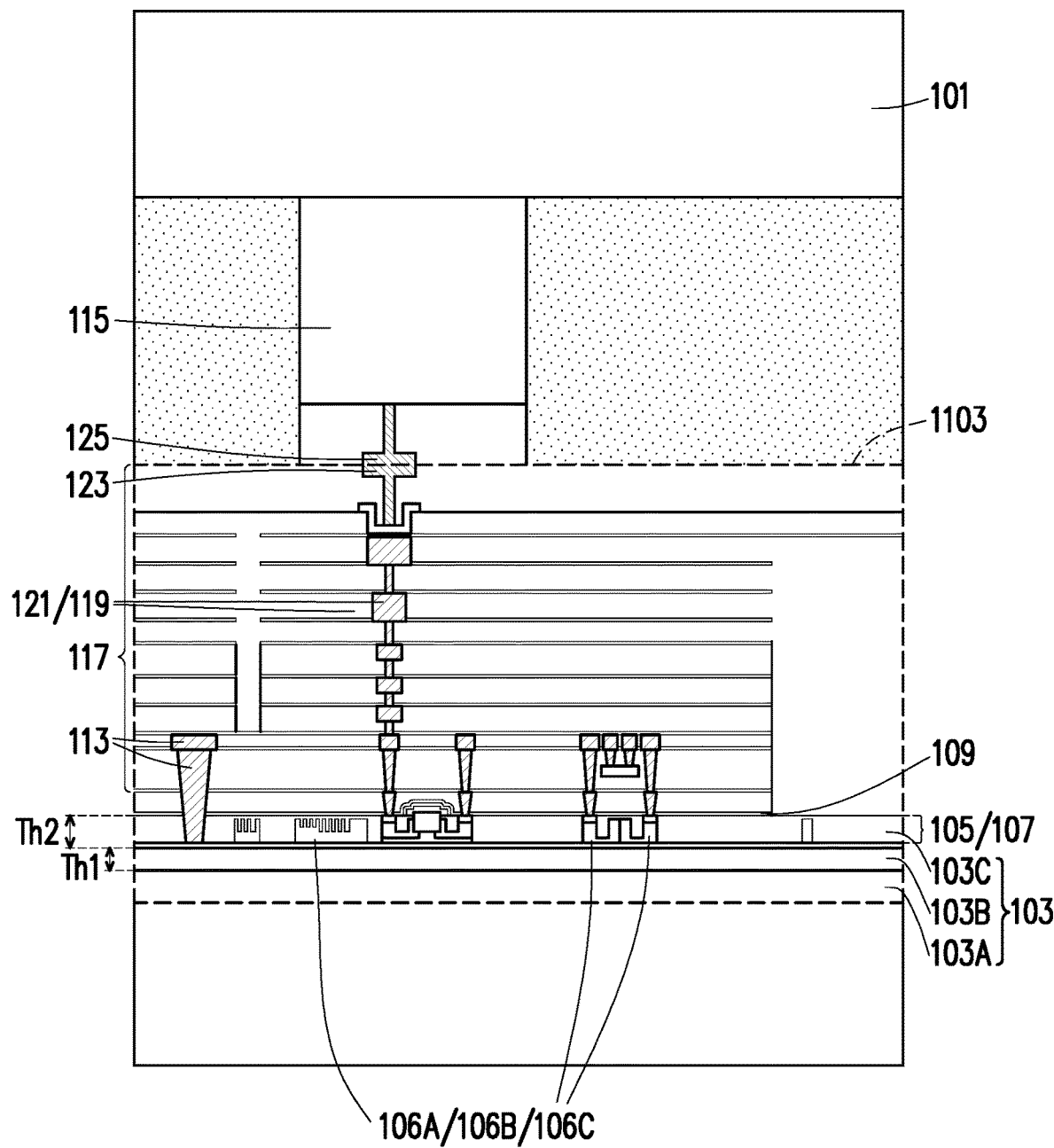
Figure 12:
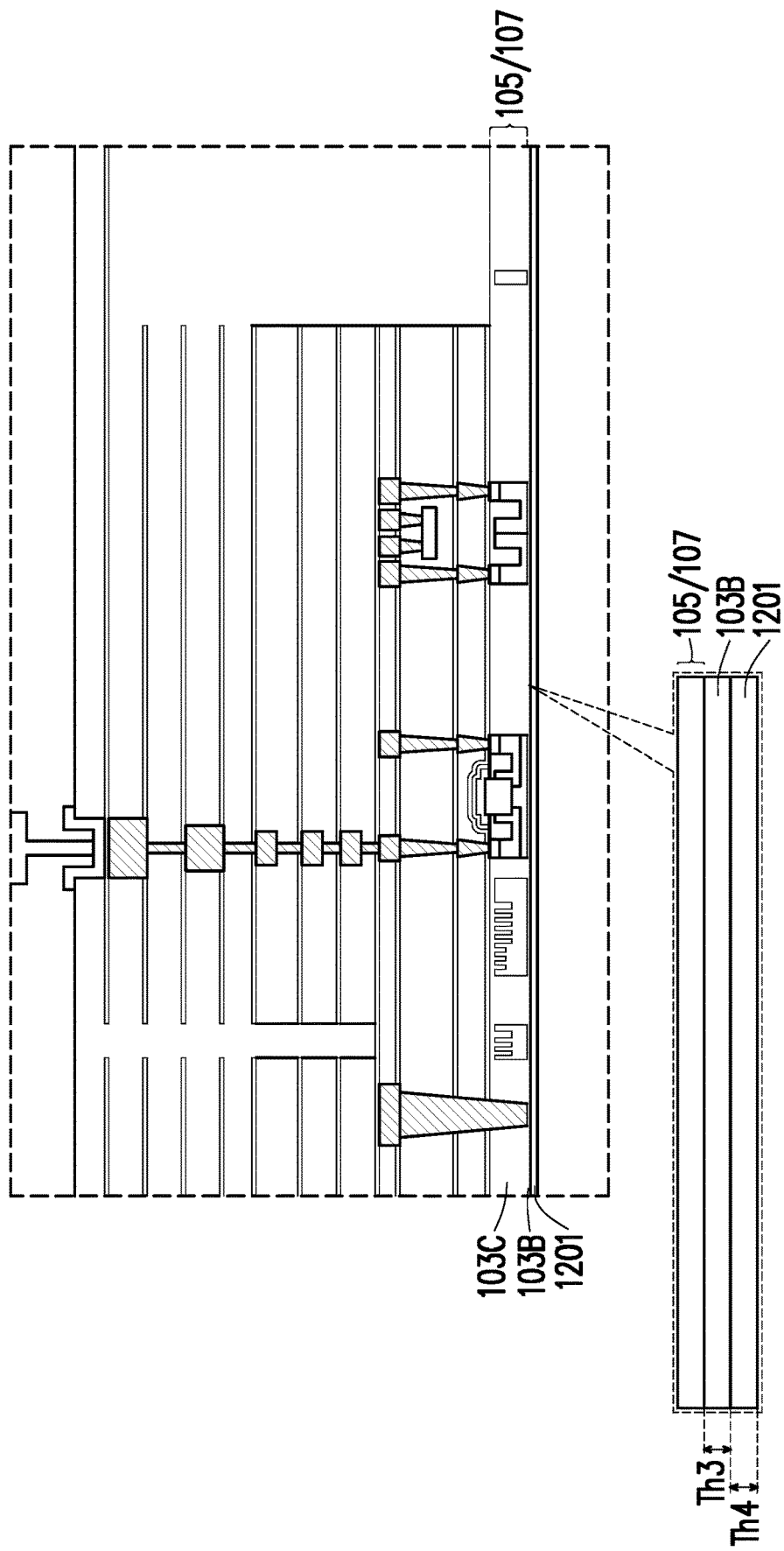
Figure 13:
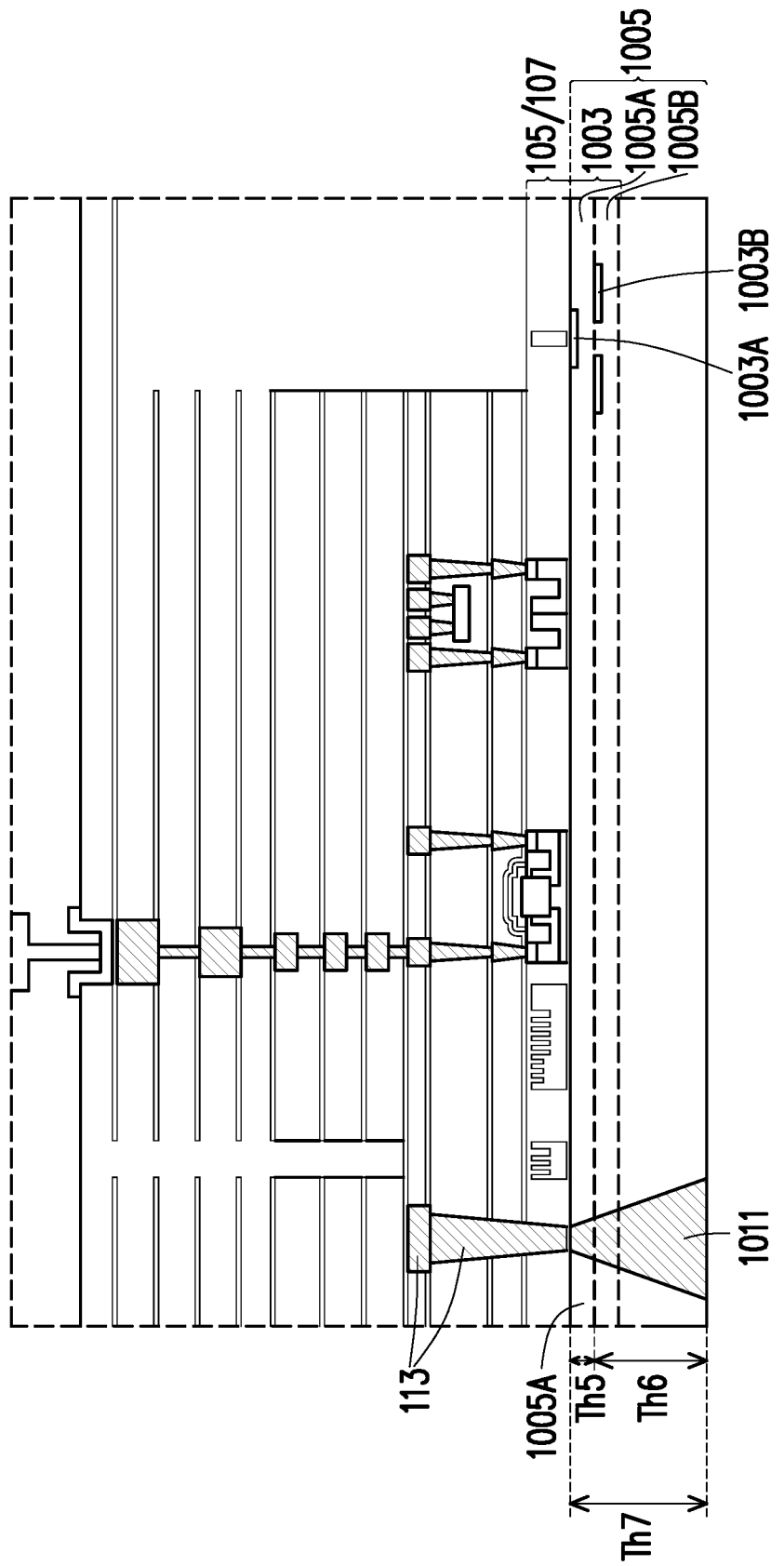

FIGS. 11-13 illustrate cross-sectional views of intermediate structures formed during intermediate steps of forming the fourth optical engine 1000, in accordance with some embodiments. FIG. 11 is similar to the magnified view illustrated in FIG. 1B except without having formed the first TIVs 111 into the semiconductor substrate 103A. FIG. 11 further illustrates a fourth region 1103 highlighted by a dashed rectangle. FIGS. 12 and 13 illustrate magnified views of the fourth region 1103 during further processing of the intermediate structure 1100 illustrated in FIG. 11, according to some embodiments.

FIG. 12 illustrates the formation of a second waveguide material layer 1201 (e.g., silicon layer), according to some embodiments. The second waveguide material layer 1201 may be formed by initially removing the semiconductor substrate 103A and thinning the buried oxide layer 103B. According to some embodiments, the semiconductor substrate 103A may be removed using a planarization process such as a chemical mechanical planarization (CMP), grinding technique, etching process (e.g., wet etch), combinations, or the like. However, any suitable process may be used to remove the semiconductor substrate 103A. Furthermore, because the semiconductor substrate 103A is removed, formation of the first TIVs 111 may be omitted according to some embodiments. In other embodiments, the first TIVs 111 may be formed to extend through the passivation layer 109, the patterned silicon layer 103C and into and/or through the buried oxide layer 103B but not to extend into the semiconductor substrate 103A.

Once the semiconductor substrate 103A has been removed, a subsequent thinning process may be used to reduce a thickness of the buried oxide layer 103B. According to some embodiments, the thickness of the buried oxide layer 103B may be reduced by performing a subsequent chemical mechanical planarization (CMP) using etchants and abrasives suitable for removing the material of the buried oxide layer 103B and exposing a surface of the buried oxide layer 103B. However, any suitable thinning process may be used. According to some embodiments, the buried oxide layer 103B may be reduced to a third thickness Th3 that is less than about 100 μm, such as 2 μm. However, any suitable thickness may be used.

Once the thickness of the buried oxide layer 103B has been reduced, the second waveguide material layer 1201 is formed adjacent the exposed surface of the buried oxide layer 103B. According to some embodiments, the second waveguide material layer 1201 is a material such as a nitride, silicon nitride, polymer, combinations, or the like and is deposited using a deposition technique such as chemical vapor deposition (CVD), atomic layer deposition (ALD), or the like. However, any suitable materials and deposition techniques may be used. Furthermore, the second waveguide material layer 1201 is deposited to a fourth thickness Th4 of between about 0.1 μm and about 0.4 μm. However, any suitable thickness may be used.

FIG. 13 illustrates that, once deposited, the second waveguide material layer 1201 is patterned to form first waveguides 1003A, according to some embodiments. The first waveguides 1003A may be formed using any of the photolithography and etching techniques suitable for patterning the first waveguides 105, as set forth above. Once the first waveguides 1003A have been formed, a first oxide protection layer 1005A is formed adjacent the first waveguides 1003A using any of the materials and techniques suitable for forming and planarizing the buried oxide layer 103B as set forth above. The first oxide protection layer 1005A may be formed and planarized to a fifth thickness Th5 of between about 0.1 μm and about 0.4 μm. However, any suitable thickness may be used.

According to some embodiments, optional second waveguides 1003B are formed adjacent the exposed surface of the first oxide protection layer 1005A. The optional second waveguides 1003B may be formed using any of the materials and techniques suitable for forming the first waveguides 1003A. Once the optional second waveguides 1003B have been formed, a second oxide protection layer 1005B is formed adjacent the second waveguides 1003B using any of the materials and techniques suitable for forming and planarizing the buried oxide layer 103B as set forth above. The second oxide protection layer 1005B may be formed and planarized to a sixth thickness Th6 of between about 4 μm and about 25 µm, such as about 5 µm. However, any suitable thickness may be used. The first oxide protection layer 1005A and the second oxide protection layer 1005B may be collectively referred to herein as the front side protection layer 1005.

The first waveguides 1003A and the second waveguides 1003B may be collectively referred to herein as the second waveguides 1003. The second waveguides 1003 allow for optical communications to be coupled to/from the first waveguides 105. In embodiments where the optional second waveguides 1003B are omitted, the second oxide protection layer 1005B is also omitted. In such embodiments, the first oxide protection layer 1005A is formed to the seventh thickness Th7 of between about 5 µm and about 25 µm. However, any suitable thickness may be used.

Openings may be formed through the front side protection layer 1005, the second waveguides 1003, and/or the buried oxide layer 103B to expose the contacts 113 embedded within the photonic die 117. Once the contacts 113 have been exposed, the second TIVs 1011 are formed within the openings. The second TIVs 1011 may be formed using any of the materials and methods used to form the first TIVs 111, as set forth above. In some embodiments, the second TIVs 1011 may be formed as copper vias.

Figure 14:
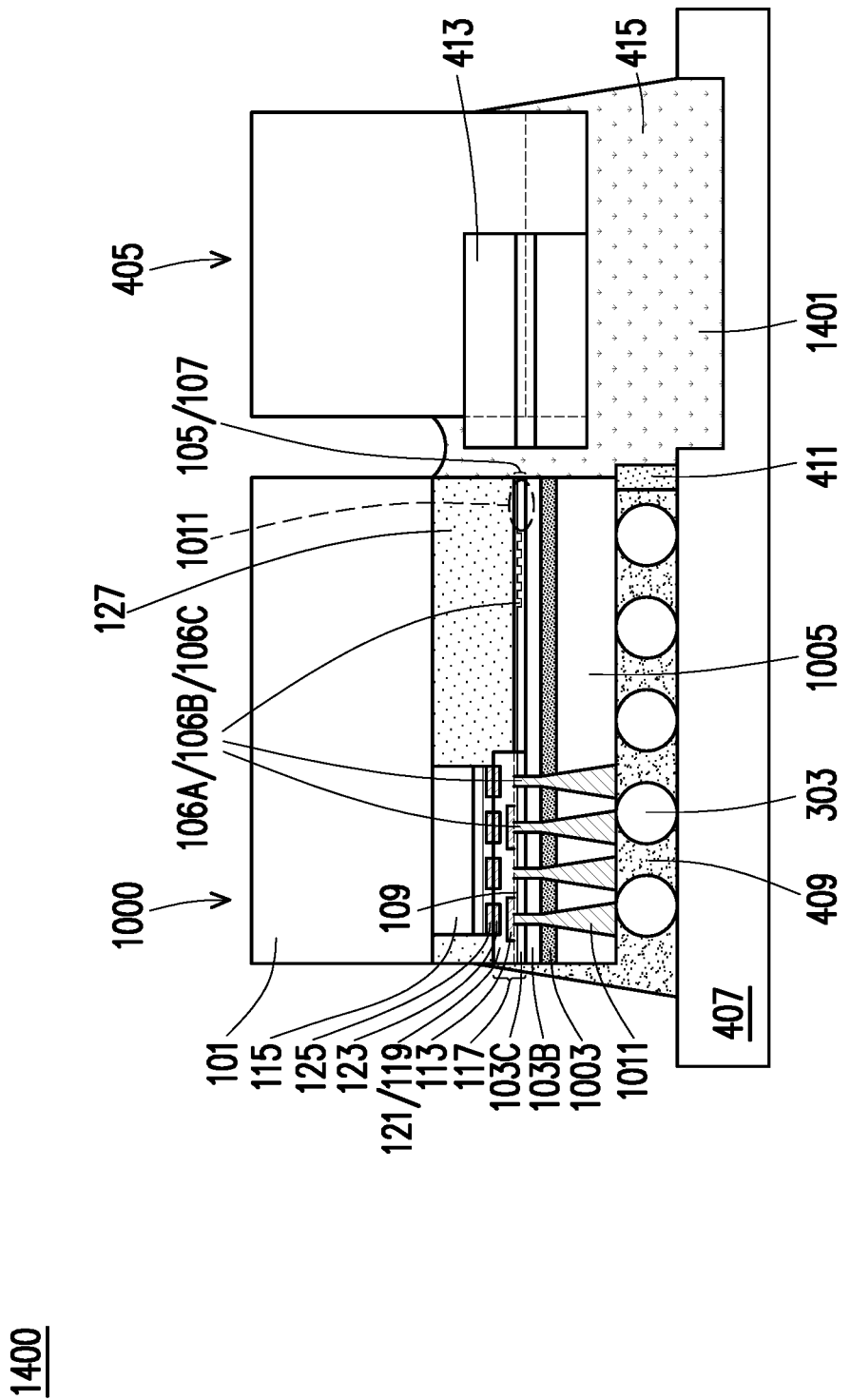
FIG. 14 illustrates formation of a fourth package assembly using the fourth optical engine, according to some embodiments.

FIG. 14 illustrates a fourth package assembly 1400, according to yet some further embodiments which utilize a cavity 1401. The fourth package assembly 1400 comprises the fourth optical engine 1000 (see, e.g., FIG. 10), the fiber attachment unit 405, and the package substrate 407, in accordance with some embodiments. The fourth optical engine 1000 may be mounted to the package substrate 407 using the first external contacts 303 and the optional spacer 411 using any of the methods set forth above for mounting the first optical engine 300, as set forth above with regard to FIG. 4. As such, the photonic die 117 is electrically coupled to the package substrate 407 by the second TIVs 1011. Once the fourth optical engine 1000 has been mounted, the optional first underfill 409 may be placed between the fourth optical engine 1000 and the package substrate 407, in accordance with some embodiments.

FIG. 14 further illustrates attachment of the optical fiber 413 and the fiber attachment unit 405 in an active alignment process with the fourth optical engine 1000, in accordance with some embodiments. FIG. 14 further illustrates the transparent adhesive 415 placed or formed within the cavity 1401 of the package substrate 407. As such, the displacement of the transparent adhesive 415 between the fiber attachment unit 405 and the package substrate 407 may be controlled by the available space of the cavity 1401 during the active alignment process. Although the active alignment process is illustrated in FIG. 14, the optical fiber 413 may be aligned and attached to the fourth optical engine 1000 using the fiber attachment unit 405 in any of the active alignment processes or any of the passive alignment processes, as discussed above.

According to some embodiments, the first semiconductor die 401 (not separately illustrated) may also be mounted to the package substrate 407 as described above with regard to the first package assembly 400. As such, the first semiconductor die 401 may be designed to cooperatively work with and may be electrically coupled to the fourth optical engine 1000 through the package substrate 407.

Figure 15:
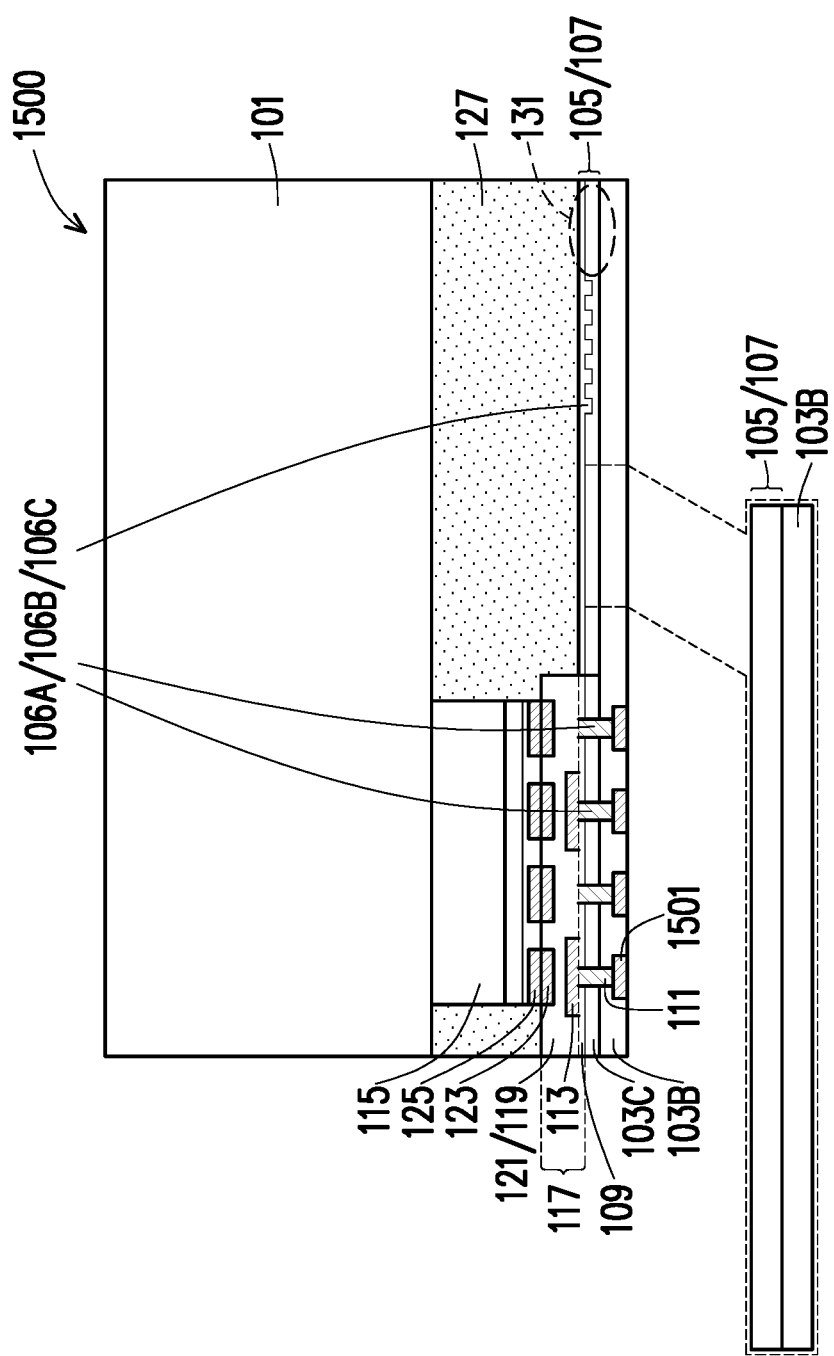
FIGS. 15-18 illustrate formation of a fifth optical engine, according to still further embodiments.
Figure 16:
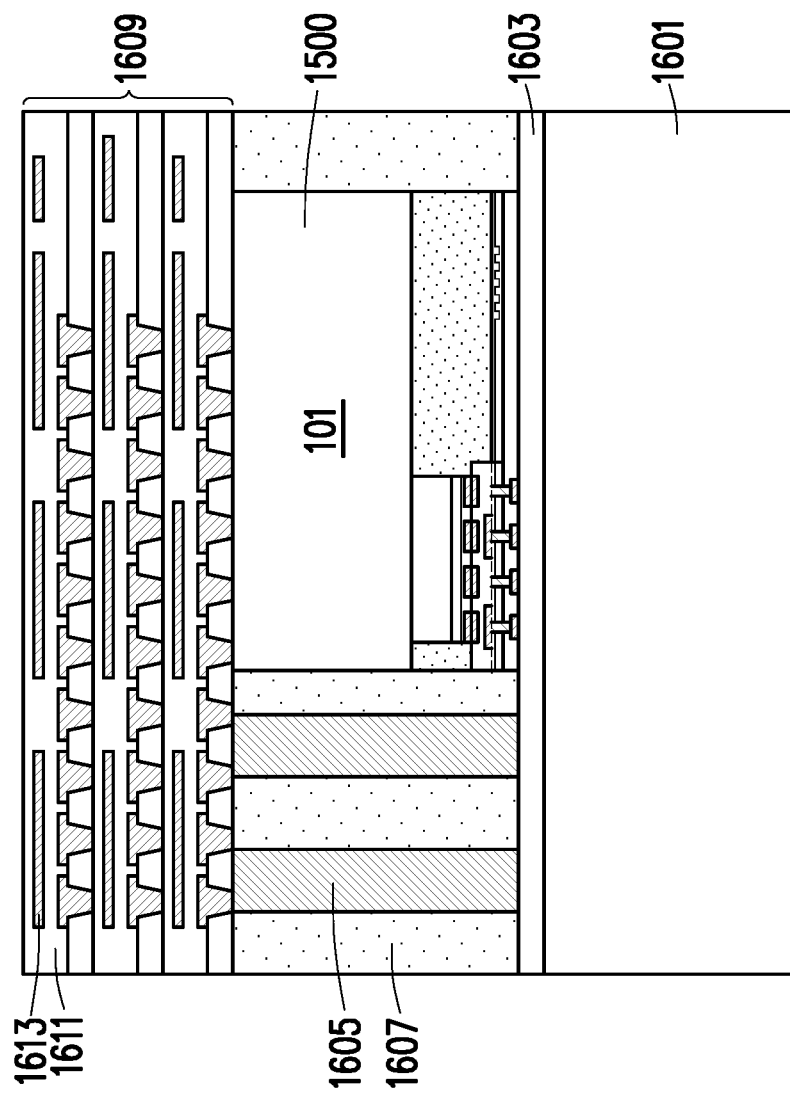
Figure 17:
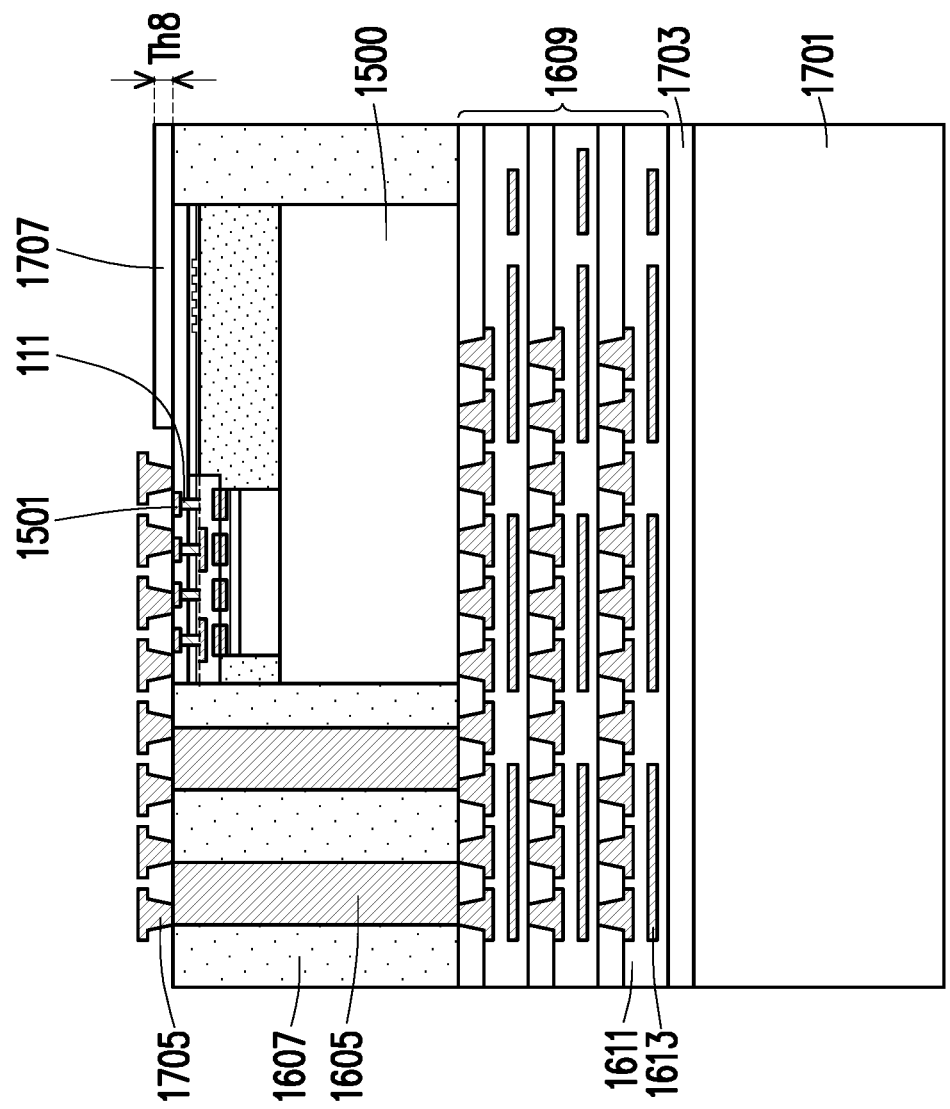

FIGS. 15-17 illustrate cross-sectional views of intermediate structures formed during intermediate steps of forming a fifth optical engine 1800 (see FIG. 18), in accordance with some embodiments. In these embodiments, the fifth optical engine 1800 may be formed by initially forming the intermediate structure illustrated in FIG. 11.

In particular, FIG. 15 illustrates a first photonic integrated circuit 1500 that is similar to the intermediate structure shown in FIG. 12 except prior to having formed the second waveguide material layer 1201 adjacent the buried oxide layer 103B. As such, any of the materials and processes suitable for forming the intermediate structure illustrated in FIG. 12 may be used to form the first photonic integrated circuit 1500. FIG. 15 further illustrates a magnified view of the first waveguides 105 and the buried oxide layer 103B after having been thinned.

Once the buried oxide layer 103B has been thinned, first TIVs 111 and/or contacts may be formed through the buried oxide layer 103B and the first waveguides 105 and electrically coupled to the contacts 113 of the photonic die 117 in order to provide electrical connectivity between the first photonic integrated circuit 1500 and other structures. In an embodiment, connection pads 1501 are formed over the first TIVs 111 using a conductive material such as aluminum, although other suitable materials, such as copper, tungsten, or the like, may alternatively be utilized. The connection pads 1501 may be formed using a process such as CVD, although other suitable materials and methods may alternatively be utilized. Once the material for the connection pads 1501 has been deposited, the material may be shaped into the connection pads 1501 using, e.g., a photolithographic masking and etching process.

FIG. 16 illustrates the formation of a pluggable modularized device which includes the first photonic integrated circuit 1500 and which also comprises a first carrier substrate 1601, a first adhesive layer 1603, and the formation of through molding vias (TMVs) 1605 over the first adhesive layer 1603. The first carrier substrate 1601 comprises, for example, silicon based materials, such as glass or silicon oxide, or other materials, such as aluminum oxide, combinations of any of these materials, or the like. The first carrier substrate 1601 is planar in order to accommodate an attachment of the first photonic integrated circuit 1500.

The first adhesive layer 1603 is placed on the first carrier substrate 1601 in order to assist in the adherence of overlying structures (e.g., the first photonic integrated circuit 1500). In an embodiment the first adhesive layer 1603 may comprise a die attach film, such as an ultra-violet glue, which loses its adhesive properties when exposed to ultra-violet light. However, other types of adhesives, such as pressure sensitive adhesives, radiation curable adhesives, epoxies, combinations of these, or the like, may also be used. The first adhesive layer 1603 may be placed onto the first carrier substrate 1601 in a semi-liquid or gel form, which is readily deformable under pressure.

The TMVs 1605 are formed over the first adhesive layer 1603, and comprise a first seed layer (not shown separately from the TMVs 1605). The first seed layer is formed over the first adhesive layer 1603, and is a thin layer of a conductive material that aids in the formation of a thicker layer during subsequent processing steps. The first seed layer may comprise a layer of titanium about 1,000 Å thick followed by a layer of copper about 5,000 Å thick. The first seed layer may be created using processes such as sputtering, evaporation, or PECVD processes, depending upon the desired materials. The first seed layer may be formed to have a thickness of between about 0.3 µm and about 1 µm, such as about 0.5 µm.

Once the first seed layer has been formed, a photoresist (not separately illustrated) is placed and patterned over the first seed layer. In an embodiment the photoresist may be placed on the first seed layer using, e.g., a spin coating technique to a height of between about 50 μm and about 250 μm, such as about 120 μm. Once in place, the photoresist may then be patterned by exposing the photoresist to a patterned energy source (e.g., a patterned light source) so as to induce a chemical reaction, thereby inducing a physical change in those portions of the photoresist exposed to the patterned light source. A developer is then applied to the exposed photoresist to take advantage of the physical changes and selectively remove either the exposed portion of the photoresist or the unexposed portion of the photoresist, depending upon the desired pattern.

In an embodiment the pattern formed into the photoresist is a pattern for the TMVs 1605. The TMVs 1605 are formed in such a placement as to allow electrical paths to be located adjacent to the subsequently placed first photonic integrated circuit 1500 and may be formed with a pitch of less than about 40 μm. However, any suitable arrangement for the pattern of TMVs 1605, such as by being located such that one or more first photonic integrated circuits 1500 are placed on opposing sides of the TMVs 1605, may be utilized.

In an embodiment the TMVs 1605 are formed within the photoresist and comprise one or more conductive materials, such as copper, tungsten, other conductive metals, or the like. The TMVs 1605 may be formed, for example, by electroplating, electroless plating, or the like. In an embodiment, an electroplating process is used wherein the first seed layer and the photoresist are submerged or immersed in an electroplating solution. The first seed layer surface is electrically connected to the negative side of an external DC power supply such that the first seed layer functions as the cathode in the electroplating process. A solid conductive anode, such as a copper anode, is also immersed in the solution and is attached to the positive side of the power supply. The atoms from the anode are dissolved into the solution, from which the cathode, e.g., the first seed layer, acquires the dissolved atoms, thereby plating the exposed conductive areas of the first seed layer within the opening of the photoresist.

Once the TMVs 1605 have been formed using the photoresist and the first seed layer, the photoresist may be removed using a suitable removal process. In an embodiment, a plasma ashing process may be used to remove the photoresist, whereby the temperature of the photoresist may be increased until the photoresist experiences a thermal decomposition and may be removed. However, any other suitable process, such as a wet strip, may be utilized. The removal of the photoresist may expose the underlying portions of the first seed layer.

Once exposed a removal of the exposed portions of the first seed layer may be performed. In an embodiment the exposed portions of the first seed layer (e.g., those portions that are not covered by the TMVs 1605) may be removed by, for example, a wet or dry etching process. For example, in a dry etching process reactants may be directed towards the first seed layer using the TMVs 1605 as masks. In another embodiment, etchants may be sprayed or otherwise put into contact with the first seed layer in order to remove the exposed portions of the first seed layer. After the exposed portion of the first seed layer has been etched away, a portion of the first adhesive layer 1603 is exposed between the TMVs 1605.

FIG. 16 additionally illustrates a placement of the first photonic integrated circuit 1500 onto the first adhesive layer 1603, according to some embodiments. In some embodiments, the first photonic integrated circuit 1500 is placed with a front side facing the first carrier substrate 1601 and is attached by the first adhesive layer 1603. For example, a pick and place tool may be used to place the first photonic integrated circuit 1500 over the first carrier substrate 1601. However, any suitable method may be used.

FIG. 16 also illustrates an encapsulation of the TMVs 1605 and the first photonic integrated circuit 1500. The encapsulation may be performed in a molding device (not individually illustrated in FIG. 16), which may comprise a top molding portion and a bottom molding portion separable from the top molding portion. When the top molding portion is lowered to be adjacent to the bottom molding portion, a molding cavity may be formed for the first carrier substrate 1601, the TMVs 1605, and the first photonic integrated circuit 1500.

During the encapsulation process the top molding portion may be placed adjacent to the bottom molding portion, thereby enclosing the first carrier substrate 1601, the TMVs 1605, and the first photonic integrated circuit 1500 within the molding cavity. Once enclosed, the top molding portion and the bottom molding portion may form an airtight seal in order to control the influx and outflux of gasses from the molding cavity. Once sealed, an encapsulant 1607 may be placed within the molding cavity. The encapsulant 1607 may be a molding compound resin such as polyimide, PPS, PEEK, PES, a heat resistant crystal resin, combinations of these, or the like. The encapsulant 1607 may be placed within the molding cavity prior to the alignment of the top molding portion and the bottom molding portion, or else may be injected into the molding cavity through an injection port.

Once the encapsulant 1607 has been placed into the molding cavity such that the encapsulant 1607 encapsulates the first carrier substrate 1601, the TMVs 1605, and the first photonic integrated circuit 1500, the encapsulant 1607 may be cured in order to harden the encapsulant 1607 for optimum protection. While the exact curing process is dependent at least in part on the particular material chosen for the encapsulant 1607, in an embodiment in which molding compound is chosen as the encapsulant 1607, the curing could occur through a process such as heating the encapsulant 1607 to between about 100° C. and about 130° C. for about 60 sec to about 3000 sec. Additionally, initiators and/or catalysts may be included within the encapsulant 1607 to better control the curing process.

However, as one having ordinary skill in the art will recognize, the curing process described above is merely an exemplary process and is not meant to limit the current embodiments. Other curing processes, such as irradiation or even allowing the encapsulant 1607 to harden at ambient temperature, may be used. Any suitable curing process may be used, and all such processes are fully intended to be included within the scope of the embodiments discussed herein.

A thinning of the encapsulant 1607 may be performed in order to expose the TMVs 1605 and backside of the first photonic integrated circuit 1500 for further processing. The thinning may be performed, e.g., using a mechanical grinding or chemical mechanical polishing (CMP) process whereby chemical etchants and abrasives are utilized to react and grind away the encapsulant 1607 and/or the backside of the first photonic integrated circuit 1500 until the TMVs 1605 and the first photonic integrated circuit 1500 have been exposed. As such, the first photonic integrated circuit 1500 and the TMVs 1605 may have a planar surface that is also coplanar with the encapsulant 1607.

However, while the CMP process described above is presented as one illustrative embodiment, it is not intended to be limiting to the embodiments. Any other suitable removal process may be used to thin the encapsulant 1607 and/or the backside of the first photonic integrated circuit 1500 and expose the TMVs 1605. For example, a series of chemical etches may be utilized. This process and any other suitable process may be utilized to thin the encapsulant 1607 and/or the backside of the first photonic integrated circuit 1500, and all such processes are fully intended to be included within the scope of the embodiments.

Once the TMVs 1605 and the first photonic integrated circuit 1500 have been embedded in the molding compound, a front side redistribution structure 1609 may be formed in electrical connection with the TMVs 1605 on the coplanar surface of the first photonic integrated circuit 1500, the TMVs 1605 and the encapsulant 1607, according to some embodiments. In an embodiment the front side redistribution structure 1609 may be formed using a series of alternating layers of front side dielectric layers 1611 and front side redistribution layers 1613. In an embodiment the front side dielectric layers 1611 may be a polymer based dielectric material such as polybenzoxazole (PBO), although any suitable material, such as polyimide or a polyimide derivative, may be utilized. The front side dielectric layers 1611 may be placed using, e.g., a spin-coating process to a thickness of between about 5 µm and about 25 µm, such as about 7 µm, although any suitable method and thickness may be used.

After each of the front side dielectric layers 1611 has been placed, the front side dielectric layer 1611 may be patterned in order to expose conductive portions of the underlying structures (e.g., the TMVs 1605). In an embodiment the front side dielectric layers 1611 may be patterned using, e.g., a photolithographic masking and etching process, whereby a photoresist is placed, exposed, and developed, and the photoresist is then used as a mask during an anisotropic etching process. However, any suitable process for patterning the front side dielectric layers 1611 may be utilized.

Once the front side dielectric layer 1611 has been patterned, the front side redistribution layer 1613 may be formed to make contact with the underlying conductive regions. In an embodiment the front side redistribution layer 1613 may be formed by initially forming a second seed layer of a titanium copper alloy through a suitable formation process such as CVD or sputtering. Once the second seed layer has been deposited, a photoresist (not separately illustrated) may be placed onto the second seed layer to prepare for a formation of the front side redistribution layer 1613. Once the photoresist has been formed and patterned, a conductive material, such as copper, may be formed on the second seed layer through a deposition process such as plating. The conductive material may be formed to have a thickness of between about 1 µm and about 10 µm, such as about 5 µm. However, while the material and methods discussed are suitable to form the conductive material, these materials are merely exemplary. Any other suitable materials, such as AlCu or Au, and any other suitable processes of formation, such as CVD or PVD, may be used to form the front side redistribution layer 1613.

Once the conductive material has been formed, the photoresist may be removed through a suitable removal process such as ashing, wet etching, or plasma etching. Additionally, after the removal of the photoresist, those portions of the second seed layer that were covered by the photoresist may be removed through, for example, a suitable etch process using the conductive material as a mask.

Once the front side redistribution layer 1613 has been formed, further front side dielectric layer 1611 and further front side redistribution layer 1613 may be formed one over the other in alternating fashion electrically coupling the front side redistribution layers 1613 to one another through the front side dielectric layers 1611 until a desired topmost front side dielectric layer 1611 is formed. The further front side dielectric layers 1611 and the further front side redistribution layers 1613 may be formed using any of the materials and processes set forth above. However, any suitable material and method of deposition may be utilized. In accordance with some embodiments, the TMVs 1605 are electrically coupled to conductive features of the topmost redistribution layer 1613 by the front side redistribution structure 1609.

In a particular embodiment the front side redistribution structure 1609 may be formed such that the front side redistribution structure 1609 has a reduced pitch between conductive elements. For example, the conductive elements may be formed to have a pitch of between about 4 µm and about 20 µm. However, any suitable pitch may be utilized.

FIG. 17 illustrates a transfer of the structure to a second carrier substrate 1701 and a removal of the first carrier substrate 1601. In an embodiment, the front side redistribution structure 1609 may be attached to the second carrier substrate 1701 using, e.g., a second adhesive layer 1703. The second carrier substrate 1701 and the second adhesive layer 1703 may be similar to the first carrier substrate 1601 and the first adhesive layer 1603 (described above with respect to FIG. 16), although any suitable structures and any suitable adhesives may be utilized.

Once the structure has been attached to the second carrier substrate, conductive studs 1705 may be formed over and electrically coupled to the TMVs 1605 and/or over the connection pads 1501 for external connection to the first photonic integrated circuit 1500. The conductive studs 1705 may be formed using a material such as copper, aluminum, combinations, or the like, by plating the material onto a seed layer partially covered by a photoresist. Once the conductive studs 1705 have been formed, the photoresist is removed and then the seed layer is etched using the conductive studs 1705 as a mask. However, any suitable materials and methods may be utilized.

FIG. 17 further illustrates the formation of a polymer waveguide 1707 over the front side of the first photonic integrated circuit 1500 to optically communicate with the first waveguide 105 during operation. According to some embodiments, the polymer waveguide 1707 may be formed using acceptable photolithography and etching techniques. For example, the polymer waveguide 1707 may be formed by initially forming a photoresist adjacent the thinned buried oxide layer 103B and overlying the conductive studs 1705 and exposed surfaces of the encapsulant 1607. Once formed, the photoresist is patterned with an opening corresponding to the first waveguide 105 and to expose a region over an edge portion of the encapsulant 1607. In some embodiments, the region over the edge portion of the encapsulant 1607 corresponds to a designated location for optical communications external to the first photonic integrated circuit 1500 during operation. Once patterned, the photoresist may be used as a mask to deposit the second waveguide material layer 1201 adjacent the buried oxide layer 103B and over the edge portion of the encapsulant 1607.

In an embodiment the polymer waveguide 1707 may be any type of waveguide, such as a planar waveguide or a channel waveguide, and may comprise two different materials, a core material and a cladding material, in which the core material has a refractive index higher than the cladding material. In an embodiment, the core material and the cladding material comprise a combination of polymer materials, such as poly(methylmethacrylate) (PMMA), polystyrene (PS), polycarbonate, polyurethane, benzocyclo butane, perfluorovinyl ether cyclopolymer, tetrafluoroethylene, perfluorovinyl ether copolymer, silicone, fluorinated poly (arylene ether sulfide, poly(pentafluorostyrene), fluorinated dendrimers, fluorinated hyperbranched polymers, or the like. In another embodiment, the core material and the cladding material may comprise deuterated and halogenrate polyacrylates, fluorinated polyimides, perfluorocyclobutyl aryl ether polymers, nonlinear optical polymers, or the like.

The core material and the cladding material of the polymer waveguide 1707 may be formed, e.g., by initially placing each layer or combination of layers within the opening of the photoresist using a process such as spin coating, doctor blading, extrusion, lamination, or the like. As each layer of the polymer waveguide 1707 is formed, the layer may be patterned and shaped in order to control and direct optical signals during operation to and from the first waveguide 105. For example, as each layer of material of the polymer waveguide 1707 is formed, a series of one or more etches such as wet etches or dry etches, may be used to shape the layers of material as desired. However any suitable methods may be utilized. According to some embodiments, the polymer waveguide 1707 may be formed to the eighth thickness Th8 of between about 3 μm and about 10 μm. However, any suitable thickness may be used.

Once the polymer waveguide 1707 has been formed, the photoresist may be removed using a removal process such as ashing. However, any suitable removal process may be used.

Figure 18:
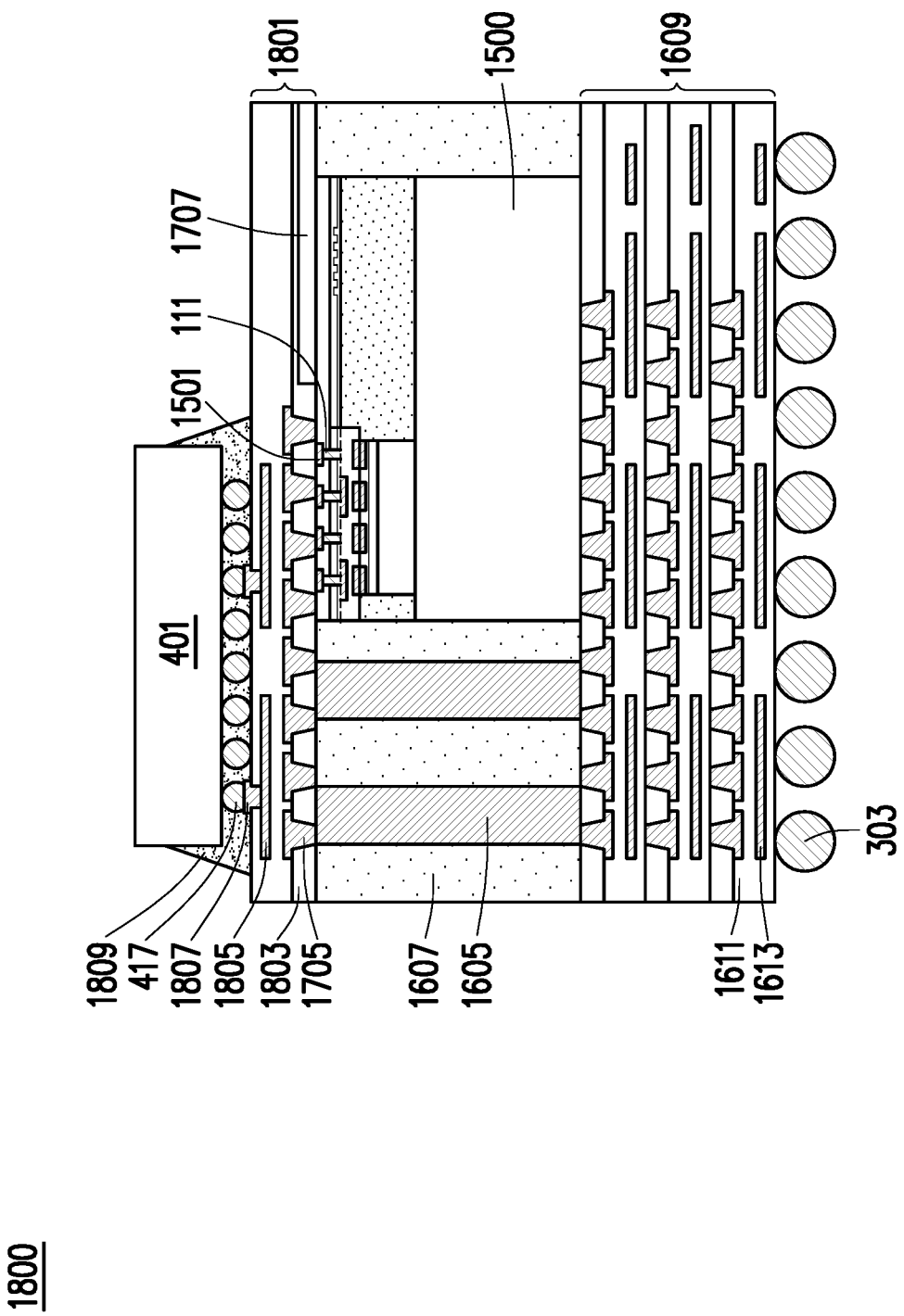

FIG. 18 illustrates an fifth optical engine 1800, according to some embodiments. In particular, FIG. 18 illustrates a formation of a backside redistribution structure 1801 formed over the conductive studs 1705, the polymer waveguide 1707, the encapsulant 1607, and the first photonic integrated circuit 1500, in accordance with some embodiments.

The backside redistribution structure 1801 may be formed using a series of alternating layers of backside dielectric layers 1803 and backside redistribution layers 1805 that are similar to the formation of the front side redistribution structure 1609 described above. The backside dielectric layers 1803 and the backside redistribution layers 1805 may be formed using any of the materials and processes used to form the front side dielectric layers 1611 and the front side redistribution layers 1613, respectively.

Additionally, a topmost layer of the backside dielectric layers 1803 may be patterned to form openings and expose areas of the underlying backside redistribution layer 1805. Contact pads 1807 may be formed within the openings. In an embodiment the contact pads 1807 may comprise aluminum, but other materials, such as copper, may be used. The contact pads 1807 may be formed using a deposition process, such as sputtering, to form a layer of material (not shown) that fills the openings within the backside dielectric layers 1803. Once filled, the material may be planarized with the backside dielectric layers 1803 using, for example, a chemical mechanical polishing process. However, any other suitable process may be utilized to form the contact pads 1807. Once formed, the backside redistribution structure 1801 electrically couples the conductive studs 1705 and the first photonic integrated circuit 1500 to the contact pads 1807 for external connection to overlying components.

FIG. 18 further illustrates the placement and mounting of the first semiconductor die 401 to the backside redistribution structure 1801. The first semiconductor die 401 may be placed into contact with the contact pads 1807 and in electrical contact with the first photonic integrated circuit 1500 and/or the TMVs 1605. As such, the first semiconductor die 401 may be designed to cooperatively work with and may be electrically coupled to the first photonic integrated circuit 1500 through the backside redistribution structure 1801. In an embodiment the first semiconductor die 401 may further comprise the second external contacts 417 (e.g., controlled collapse chip connection (C4) bumps). However, any suitable materials and/or structures may be utilized for the second external contacts 417.

The first semiconductor die 401 may be placed onto the contact pads 1807 using, e.g., a pick and place process. However, any other method of placing the first semiconductor die 401 may be used. Once in physical contact, a bonding process may be performed in order to bond the first semiconductor die 401 with the contact pads 1807. For example, in an embodiment in which the contact pads 1807 are solder bumps, the bonding process may comprise a reflow process whereby the temperature of the contact pads 1807 is raised to a point where the contact pads 1807 will liquefy and flow, thereby bonding the first semiconductor die 401 to the contact pads 1807 once the contact pads 1807 re-solidifies.

FIG. 18 further illustrates a placement of an optional fifth underfill 1809 between the first semiconductor die 401 and the backside redistribution structure 1801. In an embodiment the optional fifth underfill 1809 is a protective material used to cushion and support the first semiconductor die 401 and the backside redistribution structure 1801 from operational and environmental degradation, such as stresses caused by the generation of heat during operation. The optional fifth underfill 1809 may be injected or otherwise formed in the space between the first semiconductor die 401 and the backside redistribution structure 1801 and may, for example, comprise a liquid epoxy that is dispensed between the first semiconductor die 401 and the backside redistribution structure 1801 and then cured to harden.

FIG. 18 also illustrates formation of the UBMs and the first external contacts 303, according to some embodiments. The UBMs and the first external contacts 303 may be formed by initially forming openings in the bottommost layer of the front side dielectric layers 1611 and exposing the front side redistribution layers 1613. The UBMs may be formed in the openings and in electrical contact with the front side redistribution layers 1613. The UBMs may be formed using any of the materials and processes disclosed above for forming UBMs. The first external contacts 303 are formed and/or placed over the UBMs, and a reflow process may be performed. However, any suitable methods and materials may be utilized.

According to some embodiments, the fifth optical engine 1800 is formed as a standalone package device with the polymer waveguide 1707 located in an edge coupler configuration for optical communications during operation. As such, the fifth optical engine 1800 may be used in various package assemblies.

Figure 19:
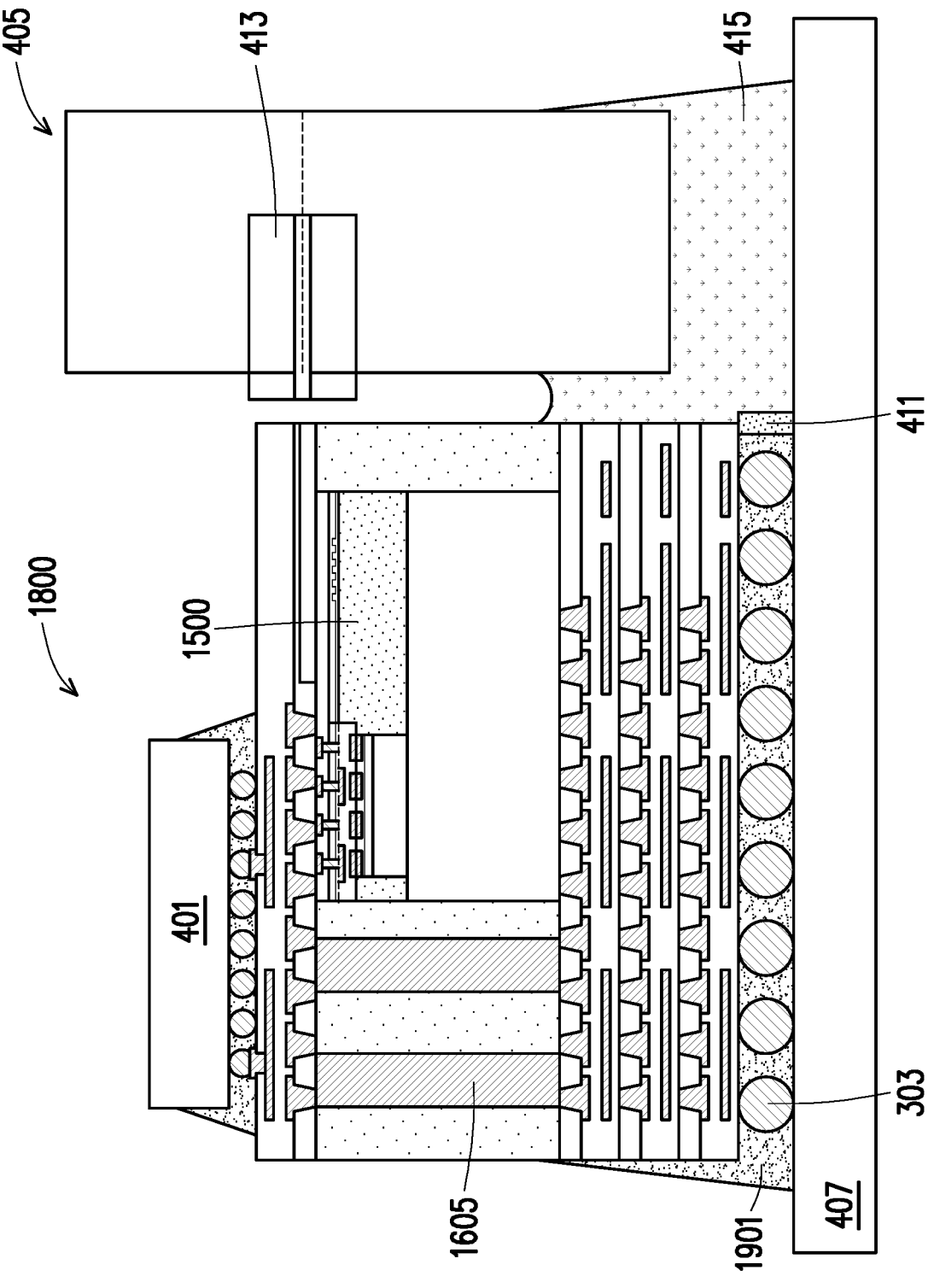
FIG. 19 illustrates a fifth package assembly using the fifth optical engine, according to some further embodiments.

FIG. 19 illustrates a fifth package assembly 1900, according to still further embodiments. The fifth package assembly 1900 comprises the fifth optical engine 1800, the fiber attachment unit 405, and the package substrate 407, in accordance with some embodiments. The fifth optical engine 1800 may be mounted to the package substrate 407 using the first external contacts 303 and the optional spacer 411 using any of the methods set forth above for mounting the first optical engine 300. As such, the first photonic integrated circuit 1500 is electrically coupled to the package substrate 407 by the TMVs 1605. Once the integrated optical engine device 1800 has been mounted, an optional sixth underfill 1901 may be placed between the fifth optical engine 1800 and the package substrate 407, in accordance with some embodiments.

FIG. 19 further illustrates attachment of the optical fiber 413 and the fiber attachment unit 405 in an active alignment process with the fifth optical engine 1800, in accordance with some embodiments. As such, the first photonic integrated circuit 1500 may optically communicate between the polymer waveguide 1707 and the optical fiber 413 in an edge coupler configuration during operation. FIG. 19 also illustrates the transparent adhesive 415 formed between the fifth optical engine 1800, the fiber attachment unit 405, and the package substrate 407. Although the active alignment process is illustrated in FIG. 19, the optical fiber 413 may be aligned and attached to the fifth optical engine 1800 using the fiber attachment unit 405 in any of the active alignment processes or any of the passive alignment processes, as discussed above.

Figure 20:
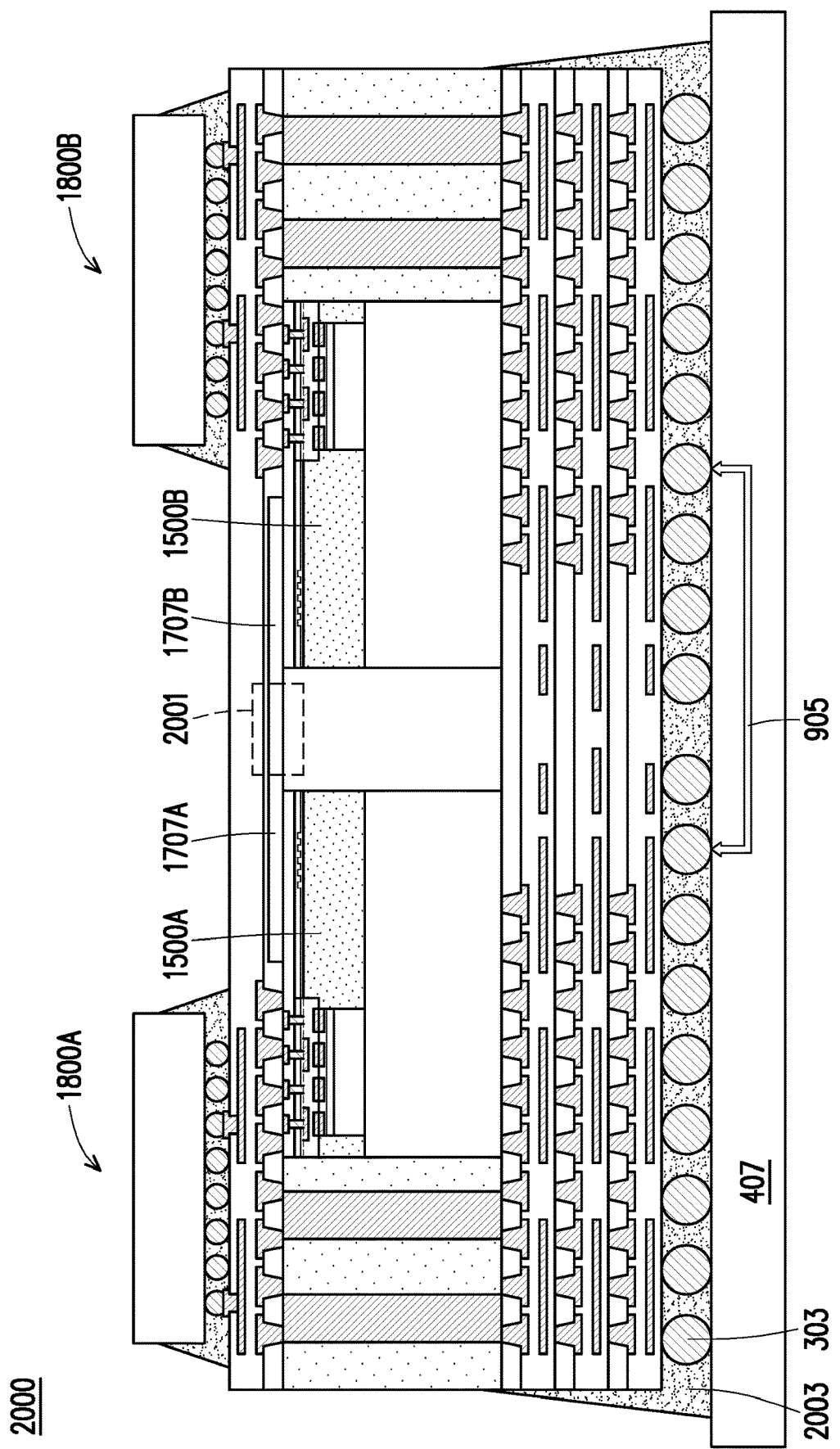
FIG. 20 illustrates a sixth package assembly using two optical engines, according to some further embodiments.

FIG. 20 illustrates a sixth package assembly 2000 comprising a first integrated optical engine device 1800A and a second integrated optical engine device 1800B that are co-packaged with the package substrate 407, according to some embodiments. The first integrated optical engine device 1800A and the second integrated optical engine device 1800B are arranged over the package substrate 407 with polymer waveguides aligned, e.g., in a pick-and-place process. For example, a first polymer waveguide 1707A of the first integrated optical engine device 1800A is aligned with a second polymer waveguide 1707B of the second integrated optical engine device 1800B to form an optical interconnect 2001. The first integrated optical engine device 1800A and the second integrated optical engine device 1800B are mounted to the package substrate 407 by performing a solder reflow process on the first external contacts 303, according to some embodiments. However, any methods suitable for mounting the first external contacts 303 to the package substrate 407, as set forth above may also be used. Once mounted, a seventh underfill 2003 may be placed between the first integrated optical engine device 1800A, the second integrated optical engine device 1800B, and the package substrate 407.

During operation, die-to-die optical communications may be performed between the first integrated optical engine device 1800A and the second integrated optical engine device 1800B over the optical interconnect 2001. Furthermore, the first integrated optical engine device 1800A and the second integrated optical engine device 1800B may receive power and signals from the package substrate 407 during operation and may conduct die-to-die electrical communications through conductive features of the package substrate 407 during operation (as indicated by the first directional arrow 905).

Figure 21:
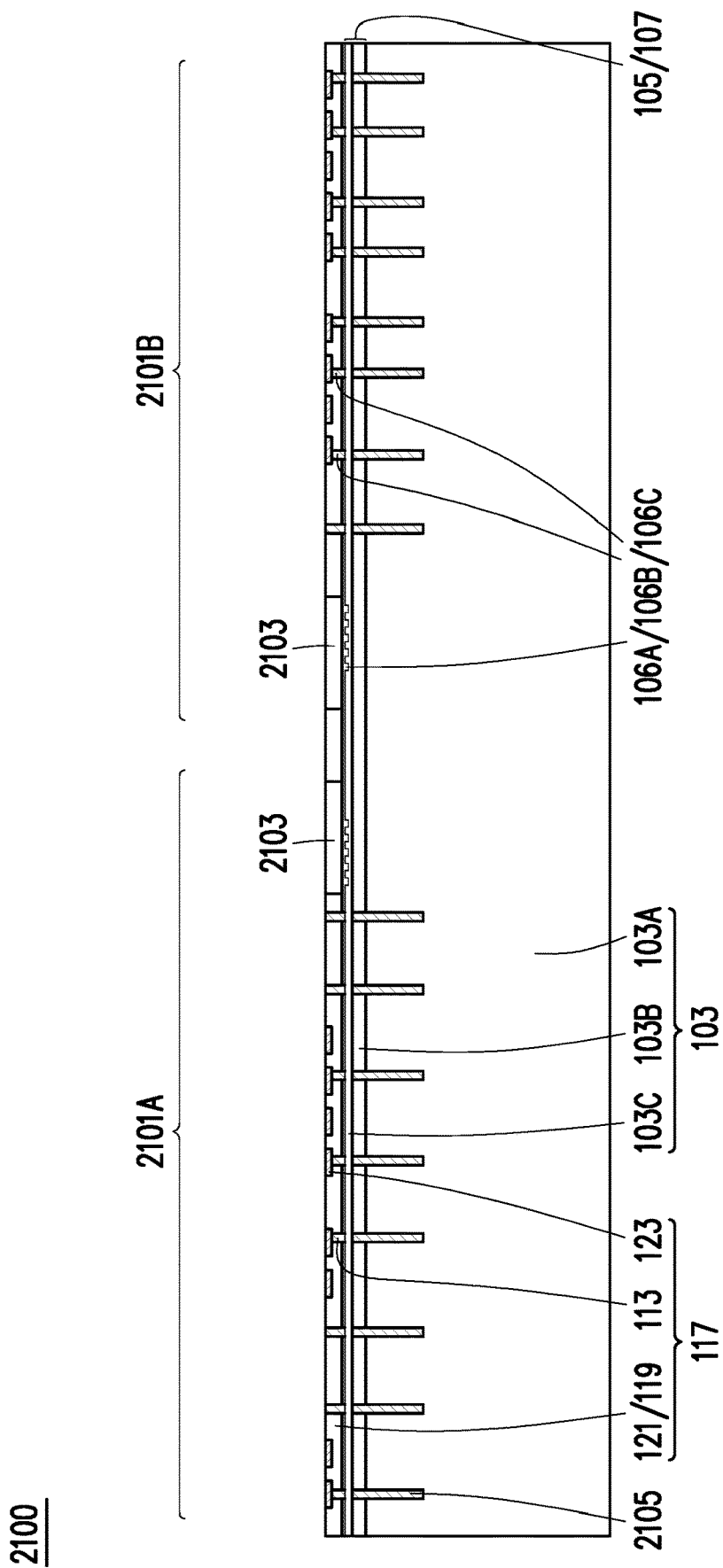
FIGS. 21-24 illustrate formation of a seventh package assembly using two optical engines, according to still further embodiments.
Figure 22:
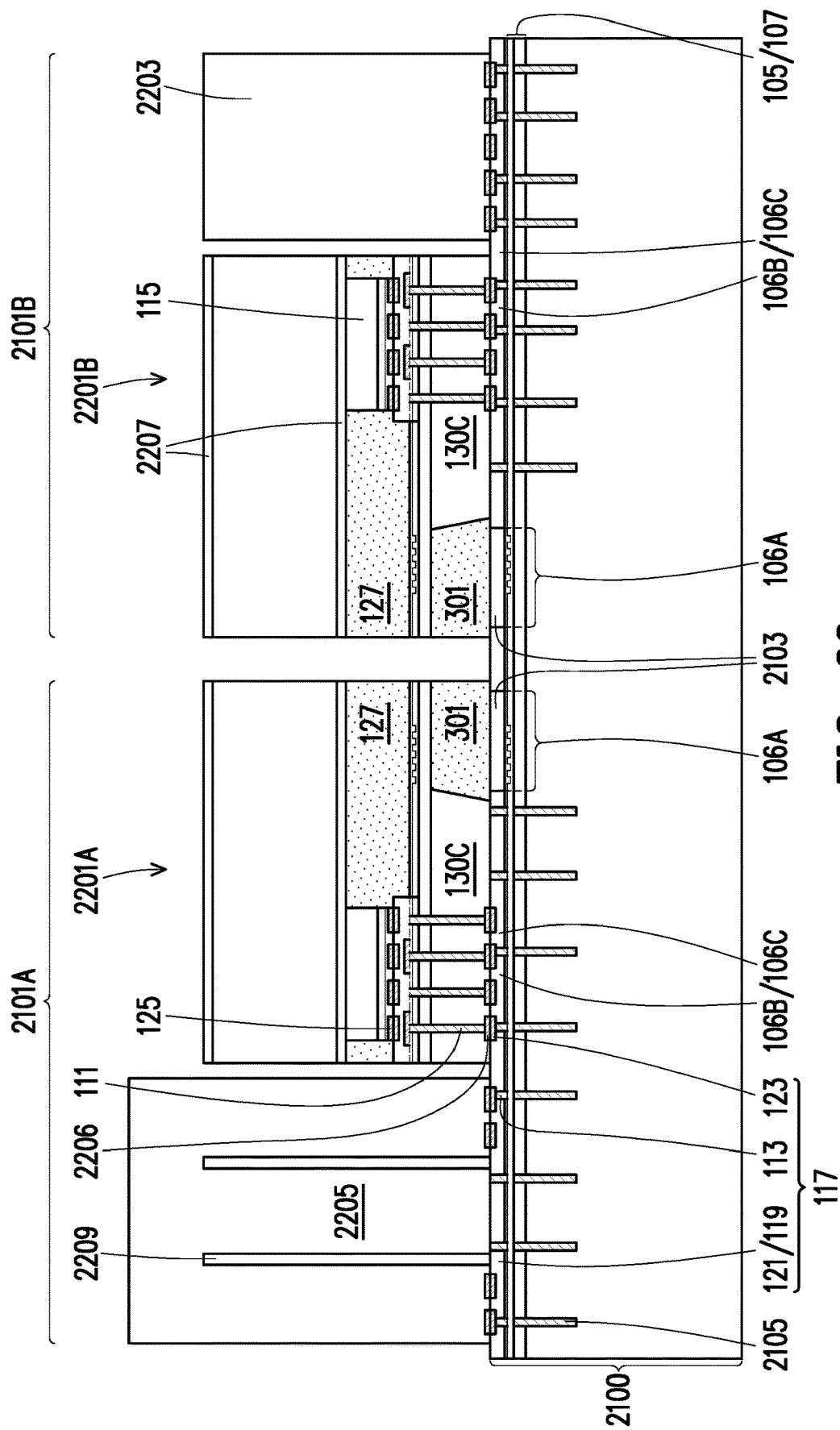
Figure 23:
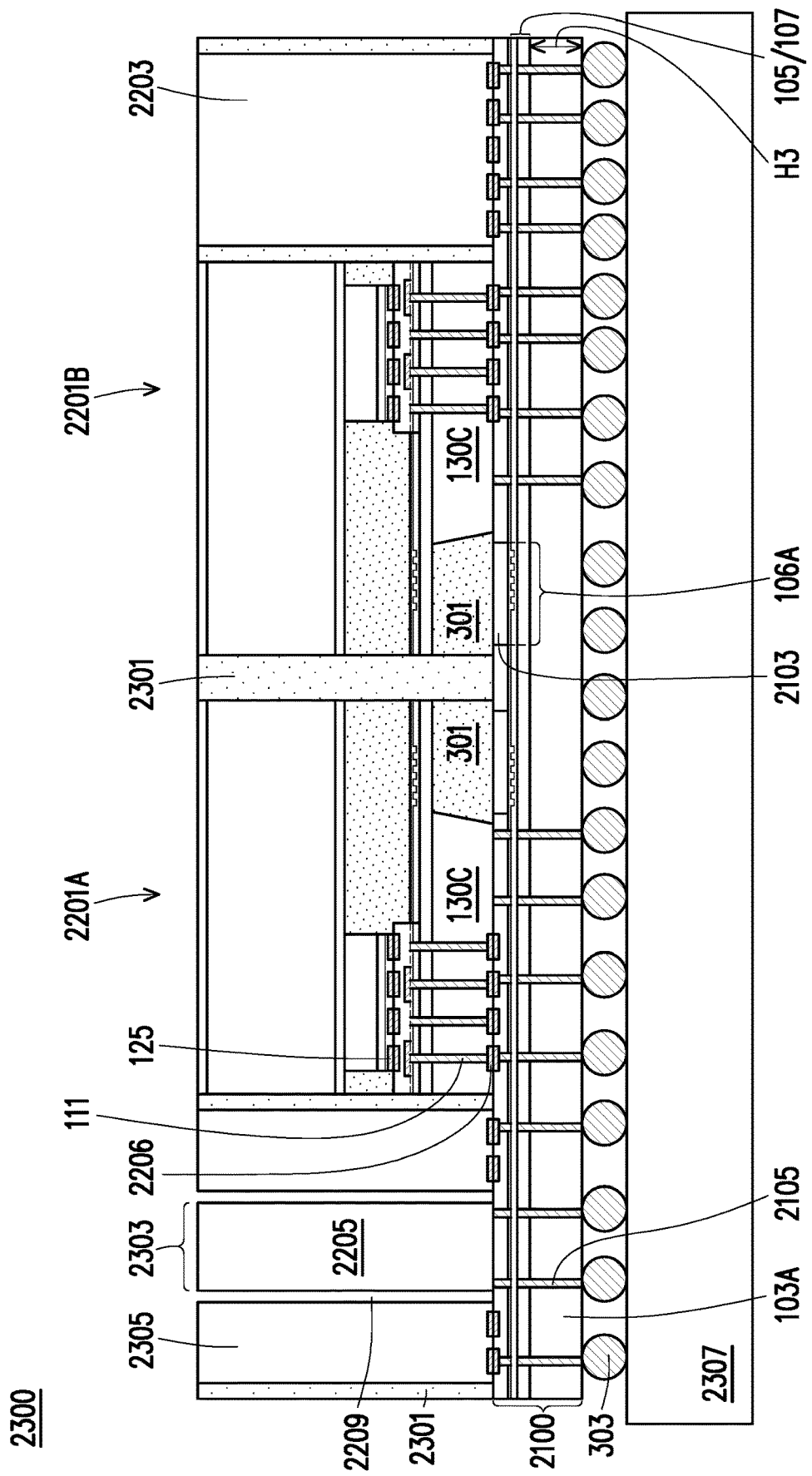

FIGS. 21-23 illustrate structures that are formed during intermediate steps of forming a seventh package assembly 2400 (see FIG. 24), according to still further embodiments. The seventh package assembly 2400 comprises a first photonic interconnect structure 2100, a first embedded optical engine 2201A and a second embedded optical engine 2201B that are co-packaged with the first photonic interconnect structure 2100, according to some embodiments.

The first photonic interconnect structure 2100 comprises a first photonic die interconnect 2101A and a second photonic die interconnect 2101B, according to some embodiments. The first photonic die interconnect 2101A and the second photonic die interconnect 2101B may be collectively referred to herein as the photonic die interconnects 2101. The photonic die interconnects 2101 may also be referred to herein as the photonic interconnect layer. Furthermore, any suitable number of the photonic die interconnects 2101 may be formed within the first photonic interconnect structure 2100 and all such photonic interconnect structures are fully intended to be included within the scope of the embodiments.

According to some embodiments, the first photonic interconnect structure 2100 may be formed by initially forming the box substrate 103, as set forth above. Once the patterned silicon layer 103C has been formed, the first waveguides 105 and first photonic components 107 (e.g., grating couplers 106A, photodetectors 106B, modulators 106C, combinations, or the like) may be formed within the patterned silicon layer 103C, as described above. Once the first waveguides 105 and first photonic components 107 have been formed, the dielectric layers 119 and the conductive feature 121, and through structure vias TSVs 2105 may be formed over and/or into the semiconductor substrate 103A. The dielectric layers 119 and the conductive features 121 may be formed over the BOX substrate 103 as set forth above. The TSVs 2105 are similar to the first TIVs 111 and may be formed through the dielectric layers 119 and into the BOX substrate 103 using any of the materials and process suitable for forming the first TIVs 111. Once the TSVs 2105 have been formed, contacts 113 of the photonic die 117 and/or conductive pads 123 of the first photonic interconnect structure 2100 may be formed within a topmost layer of the dielectric layers 119 and in electrical connection to the conductive features 121 and/or the TSVs 2105.

FIG. 21 further illustrates a formation of optical windows 2103 through the dielectric layers 119, according to some embodiments. The optical windows 2103 are formed by initially forming openings through the dielectric layers 119 over locations of grating couplers 106A in the first waveguides 105. Once formed, the openings are filled with optical materials transparent to the relevant wavelengths of light (e.g., silicon oxide, optical glue (e.g., optically clear adhesive (OCA)), optical resins, optical glass, optical ceramics, combinations, or the like) to be used instead of opaque materials that are optical isolators (e.g., opaque dielectrics, encapsulant, molding compounds, or the like). The optical windows 2103 may also be referred to herein as optical feedthroughs or optical passageways. In some embodiments, the optical material used to form the optical windows 2103 is an index-matching material that matches an index of a material of an overlying structure (e.g., embedded optical engines 2201; see FIG. 22).

In some embodiments, the optical windows 2103 are located in some regions of the photonic die interconnects 2101 that are substantially free of the conductive feature 121, the contacts 113, the conductive pads 123, and the interconnect TIVs 111 in order to allow transmission of optical power and/or optical signals through the dielectric layers 119. For example, these regions may extend between the grating couplers 106A and the overlying structure (e.g., embedded optical engines 2201) to allow optical power or optical signals to be coupled from the first waveguides 105 of the photonic die interconnects 2101 into the embedded optical engines 2201 and/or to be coupled from the embedded optical engines 2201 into the first waveguides 105 of the photonic die interconnects 2101. In some cases, a thinner photonic die 117 may allow for more efficient optical coupling between the grating couplers 106A and the overlying structures (e.g., embedded optical engines 2201).

FIG. 22 illustrates the attachment of the embedded optical engines 2201, a second semiconductor die 2203, and a sacrificial block 2205 to the photonic die interconnects 2101 according to some embodiments. The embedded optical engines 2201 are similar to the first optical engine 300 except die pads 2206 are formed in electrical connection with the first TIVs 111 for external connection instead of the first external contacts 303. In some embodiments, a hybrid bonding process may be used with, for example, a pick-and-place process to mount the first embedded optical engine 2201A and the second embedded optical engine 2201B to the first photonic die interconnect 2101A and the second photonic die interconnect 2101B, respectively. As such, the die pads 2206 and the semiconductor substrate 103A of the embedded optical engines 2201 are bonded to the conductive pads 123 and the dielectric layers 119 of the photonic die interconnects 2101, respectively. During the hybrid bonding process, the first backfill structure 301 of the embedded optical engine 2201 is also bonded to the dielectric layers 119 and/or the optical windows 2103 of the photonic die interconnects 2101. In some embodiments, an optical adhesive (e.g., optical clear glue) may be used during the hybrid bonding process to assist in the bonding of the first backfill structures 301 to the optical windows 2103.

FIG. 22 further illustrates an optional interfacial layer 2207 of the embedded optical engines 2201, according to some embodiments. In some embodiments, the optional interfacial layer 2207 may be disposed between the support substrate 101 and the coplanar surface of the gap-fill material 127 and the electronic die 115. The optional interfacial layers 2207 may be an optical dielectric material that is transparent to the relevant wavelengths of light and may be formed using any of the materials and methods that are suitable for forming the gap-fill material 127 set forth above. In some embodiments, the optional interfacial layer 2207 is an index-matching material that matches an optical index of the gap-fill material 127 to an optical index of the support substrate 101. As such, the optional interfacial layer 2207 may prevent optical loss and/or distortion of optical communications passing between the gap-fill material 127 and the support substrate 101 during operation. According to some embodiments, the optional interfacial layer 2207 may also be added to a backside of the support substrate 101 for subsequent connection of an optical fiber 413 (see FIG. 24). In such embodiments, the optional interfacial layer 2207 may be an index-matching material that matches an optical index of the optical fiber 413 to the optical index of the support substrate 101. As such, the optional interfacial layer 2207 may prevent optical loss and/or distortion of optical communications passing between the optical fiber 413 and the support substrate 101 during operation.

The second semiconductor die 2203 is similar to the first semiconductor die 401 except die pads 2206 are provided for external connection instead of the second external contacts 417 (shown in FIG. 4). According to some embodiments, the die pads 2206 of the second semiconductor die 2203 may be bonded to conductive pads 123 of the first photonic interconnect structure 2100 in a hybrid bonding process. As such, dielectric material of the second semiconductor die 2203 (e.g., encapsulant, molding compound, silicon oxide, combinations, or the like) that is exposed between the die pads 2206 may also be bonded to the dielectric layers 119 of the photonic die 117 during the hybrid bonding process. According to some embodiments, the second semiconductor die 2203 is an ASIC device (e.g., multi-host controller, switch, or the like) that is designed to cooperate during operation with two or more of the embedded optical engines 2201 (e.g., first embedded optical engine 2201A and the second embedded optical engine 2201B).

Additionally, while the embodiments are illustrated with a single second semiconductor die 2203, this is intended to be illustrative and is not intended to be limiting to the embodiments. Rather, any suitable number of second semiconductor dies 2203, such as two or more, may be used. All such number of dies are fully intended to be included within the scope of the embodiments.

According to some embodiments, the sacrificial block 2205 is formed by initially patterning block openings 2209 into but not through a bulk silicon material (e.g., a semiconductor substrate, glass, ceramic, dielectric, bulk semiconductor, silicon wafer, or the like) over a carrier. The block openings 2209 may be formed by acceptable photolithography and etching techniques, such as by forming and patterning a photoresist and then performing an etching process using the patterned photoresist as an etching mask. Once the block openings 2209 have been formed, the photoresist may be removed using a suitable removal process (e.g., ashing).

The patterned bulk silicon material may be singulated into individual sacrificial blocks 2205 by initially transferring the patterned bulk silicon material to a dicing tape. Once transferred to the dicing tape, the patterned bulk silicon may be singulated into a plurality of the sacrificial blocks 2205 using a suitable singulation process such as scribing and breaking, sawing, etching, laser cutting, combinations or the like.

Once singulated, the sacrificial block 2205 is placed with the block openings 2209 facing the first photonic interconnect structure 2100 using, for example, a pick-and-place process. However, any suitable process may be used. According to some embodiments, the sacrificial block 2205 is attached to the first photonic interconnect structure 2100 using an adhesive (e.g., die attach film, light activated adhesive, epoxy, interface materials, combinations, or the like) that is applied to the surface of the sacrificial block 2205 facing the first photonic interconnect structure 2100. In some embodiments, a first adhesive is a light activated adhesive and is applied in a central region of the surface. According to some embodiments, the light activated adhesive may be activated using a first wavelength of light and may be deactivated using a second wavelength of light. In some embodiments, a second adhesive that is different from the first adhesive is applied along a perimeter of the surface surrounding the first adhesive. In some embodiments, the second adhesive is not a light activated adhesive. In some embodiments, wherein the second adhesive is a light activated adhesive, the second adhesive may be activated using the first wavelength of light but is not deactivated by the second wavelength of light. However, any suitable adhesives or combination of adhesives may be used.

FIG. 23 illustrates a formation of a multiple optical engine device 2300, according to some embodiments. In particular, FIG. 23 illustrates an encapsulation of the sacrificial block 2205, the embedded optical engines 2201, and the second semiconductor die 2203. The encapsulation may be performed in a molding device (not individually illustrated in FIG. 23), which may comprise a top molding portion and a bottom molding portion separable from the top molding portion. When the top molding portion is lowered to be adjacent to the bottom molding portion, a molding cavity may be formed for the first photonic interconnect structure 2100, the sacrificial block 2205, the embedded optical engines 2201, and the second semiconductor die 2203.

During the encapsulation process the top molding portion may be placed adjacent to the bottom molding portion, thereby enclosing the first photonic interconnect structure 2100, the sacrificial block 2205, the embedded optical engines 2201, and the second semiconductor die 2203 within the molding cavity. Once enclosed, the top molding portion and the bottom molding portion may form an airtight seal in order to control the influx and outflux of gasses from the molding cavity. Once sealed, an encapsulant 2301 may be placed within the molding cavity. The encapsulant 2301 may be a molding compound resin such as polyimide, PPS, PEEK, PES, a heat resistant crystal resin, combinations of these, or the like. The encapsulant 2301 may be placed within the molding cavity prior to the alignment of the top molding portion and the bottom molding portion, or else may be injected into the molding cavity through an injection port.

Once the encapsulant 2301 has been placed into the molding cavity such that the encapsulant 2301 encapsulates the first photonic interconnect structure 2100, the sacrificial block 2205, the embedded optical engines 2201, and the second semiconductor die 2203, the encapsulant 2301 may be cured in order to harden the encapsulant 2301 for optimum protection. While the exact curing process is dependent at least in part on the particular material chosen for the encapsulant 2301, in an embodiment in which molding compound is chosen as the encapsulant 2301, the curing could occur through a process such as heating the encapsulant 2301 to between about 100° C. and about 130° C., such as about 125° C. for about 60 sec to about 3000 sec, such as about 600 sec. Additionally, initiators and/or catalysts may be included within the encapsulant 2301 to better control the curing process.

However, as one having ordinary skill in the art will recognize, the curing process described above is merely an exemplary process and is not meant to limit the current embodiments. Other curing processes, such as irradiation or even allowing the encapsulant 2301 to harden at ambient temperature, may be used. Any suitable curing process may be used, and all such processes are fully intended to be included within the scope of the embodiments discussed herein.

Once the encapsulant 2301 has been cured, the encapsulant 2301 may be planarized (e.g., chemical mechanical planarization) and a support carrier may be attached to the planar surface of the encapsulant 2301 to provide support during further handling and processing. In an embodiment, the support carrier may be attached using a die attach film, an ultra-violet glue, which loses its adhesive properties when exposed to ultra-violet light. However, other types of adhesives, such as pressure sensitive adhesives, radiation curable adhesives, epoxies, combinations of these, or the like, may also be used. The adhesive may be placed onto the support carrier in a semi-liquid or gel form, which is readily deformable under pressure. Once the support carrier has been attached, the back side of the semiconductor substrate 103A is thinned and the TSVs 2105 are exposed. The semiconductor substrate 103A may be thinned by a CMP process, a mechanical grinding, or the like. According to some embodiments, the semiconductor substrate 103A is thinned to a third height H3 of between about 25,000 nm and about 100,000 nm. However, any suitable height may be used.

Once the TSVs 2105 have been exposed, the first external contacts 303 may be formed over and in electrical connection with the TSVs 2105. The first external contacts 303 may be formed over the TSVs 2105 using any of the materials and processes suitable for forming the first external contacts 303 over the first TIVs 111, as set forth above. Once the first external contacts 303 have been formed, a carrier tape 2307 is attached to the first external contacts 303 and the carrier support is removed to expose the backside of the encapsulant 2301 for further processing.

FIG. 23 further illustrates a thinning of the encapsulant 2301 in order to expose and/or thin the sacrificial block 2205, the embedded optical engines 2201, and the second semiconductor die 2203 for further processing. The thinning may be performed, e.g., using a mechanical grinding or chemical mechanical polishing (CMP) process whereby chemical etchants and abrasives are utilized to react and grind away the encapsulant 2301 until the and the sacrificial block 2205, the embedded optical engines 2201, and the second semiconductor die 2203 have been exposed. In some embodiments, the thinning is performed until the block openings 2209 are revealed at the backside of the sacrificial block 2205. In such embodiments, a block core 2303 is formed between the block openings 2209 and remaining portions of the sacrificial block 2205 form sidewalls of a vertical fiber attachment unit 2305. As such, the sacrificial block 2205, the embedded optical engines 2201, and the second semiconductor die 2203 may have a planar surface that is also coplanar with the encapsulant 2301.

However, while the CMP process described above is presented as one illustrative embodiment, it is not intended to be limiting to the embodiments. Any other suitable removal process may be used to thin the encapsulant 2301 and the sacrificial block 2205 and expose the block openings 2209. For example, a series of chemical etches may be utilized. This process and any other suitable process may be utilized to thin the encapsulant 2301 and the sacrificial block 2205, and all such processes are fully intended to be included within the scope of the embodiments.

Figure 24:
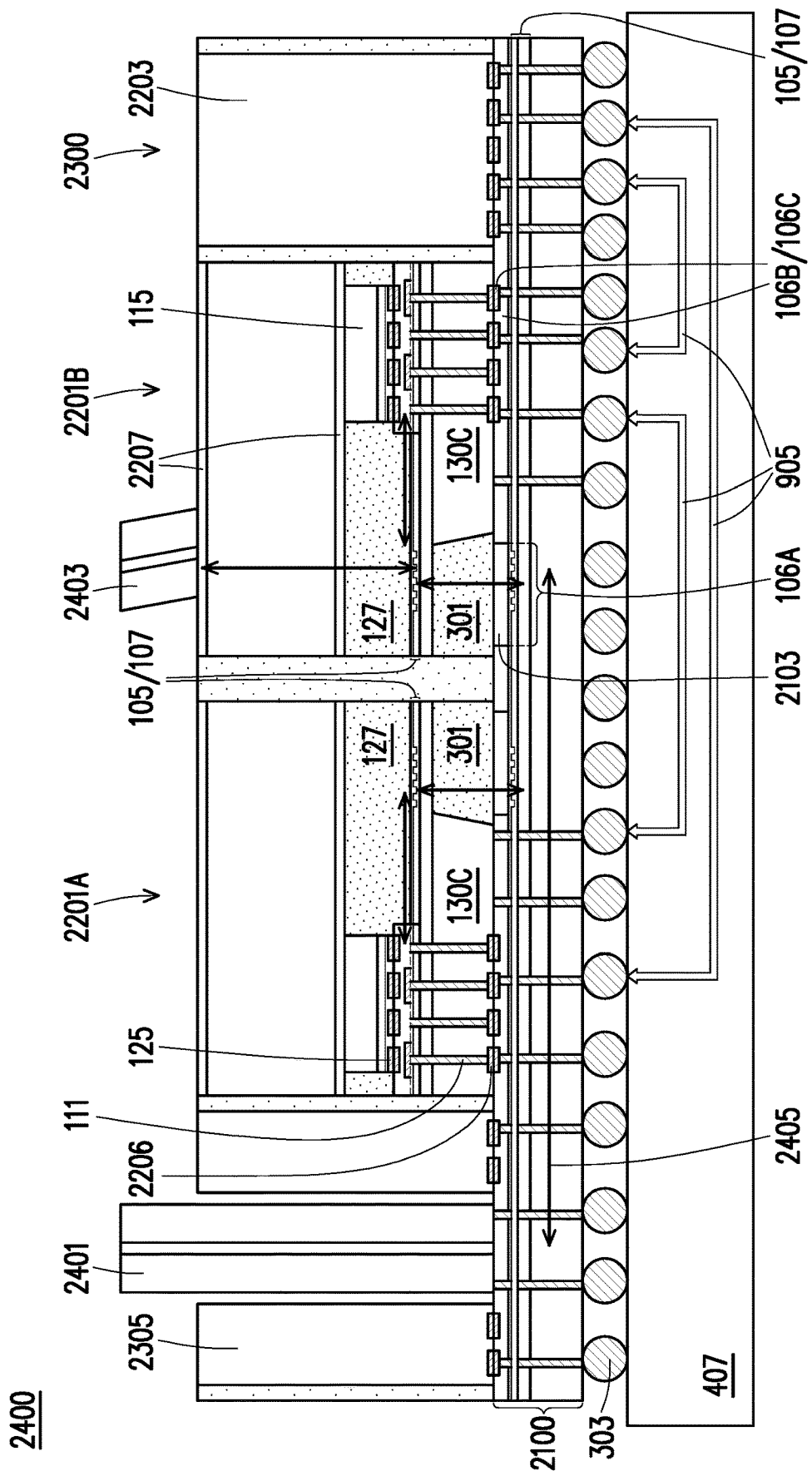

FIG. 24 illustrates the seventh package assembly 2400 comprising the multiple optical engine device 2300, according to some embodiments. In particular, FIG. 24 illustrates a mounting of the multiple optical engine device 2300 to the package substrate 407, a removal of the block core 2303, and attachment of a first optical fiber 2401 and a second optical fiber 2403, according to some embodiments.

The multiple optical engine device 2300 may be removed from the carrier tape 2307 and placed over the package substrate 407 using, for example, a pick-and-place process. Once placed, the multiple optical engine device 2300 may be mounted to the package substrate 407 for example by performing a suitable bonding process such as a solder reflow process to bond the first external contacts 303 of the multiple optical engine device 2300 to conductive contacts of the package substrate 407. However, any suitable bonding process may be utilized.

Once mounted to the package substrate 407, the block core 2303 may be removed from the sacrificial block 2205. In embodiments wherein the sacrificial block 2205 is attached using a first adhesive that is light activated, the block core 2303 may be removed by deactivating the adhesive using a light source of the first wavelength, as described above. As such, the block core 2303 is released from the first photonic interconnect structure 2100 and may be removed using, for example, a pick-and-place process. However, any suitable removal process may also be used.

Once the block core 2303 has been removed, a cavity is formed within the vertical fiber attachment unit 2305 and the first optical fiber 2401 may be attached to the multiple optical engine device 2300. According to some embodiments, the first optical fiber 2401 may be a power optical fiber and may be inserted into the cavity of the vertical fiber attachment unit 2305 in a location over the first waveguides 105 and/or first photonic components 107. According to some embodiments, sidewalls of the vertical fiber attachment unit 2305 secure the first optical fiber 2401 in a vertical position, for example, by a frictional force. In some embodiments, an optical adhesive (e.g., optically clear glue) transparent to the relevant wavelengths of light may be used to secure the first optical fiber 2401 within the vertical fiber attachment unit 2305.

In some embodiments, the second optical fiber 2403 may be attached to the optional interfacial layer 2207 of an optical engine (e.g., the second embedded optical engine 2201B). According to some embodiments, the optional interfacial layer 2207 is a light activated adhesive film. In such embodiments, the second optical fiber 2403 may be a signal optical fiber and may be attached to the optional interfacial layer 2207 by projecting a source light of an activation wavelength of the light activated adhesive film. In some embodiments, an optical adhesive transparent to the relevant wavelengths of light may be used to secure the second optical fiber 2403 to the optional interfacial layer 2207 or the backside of the second embedded optical engine 2201B. In other embodiments, a second fiber attachment unit (not shown) may be used to attach the second optical fiber 2403.

FIG. 24 further illustrates that, during operation, the embedded optical engines 2201 and the second semiconductor die 2203 may receive electrical power and/or electrical communications via the package substrate 407 as indicated by the first directional arrows 905. In addition, the embedded optical engines 2201 and the first optical fiber 2401 and the second optical fiber 2403 may optically communicate during operation as indicated by the second directional arrows 2405.

The first waveguides 105 and the first photonic components 107 of the first photonic interconnect structure 2100 are utilized to transmit and receive optical signals between the first optical fiber 2401 (e.g., power fiber) and the embedded optical engines 2201. In particular, the first photonic components 107 of the first photonic interconnect structure 2100 converts electrical signals to optical signals for transmission along the first optical fiber 2401, and convert optical signals from the first optical fiber 2401 to electrical signals. Accordingly, the first photonic components 107 of the first photonic interconnect structure 2100 are responsible for the input/output (I/O) of optical signals to/from the first optical fiber 2401. In some embodiments, the first photonic components 107 of the first photonic interconnect structure 2100 may be used to exchange optical communications between the 2201A and 2201B, for example, in die-to-die communication. According to some embodiments, the second semiconductor die 2203 may be, for example, a multi-die switch that controls the flow of optical communications and electrical communications of the embedded optical engines 2201.

The first waveguides 105 and the first photonic components 107 of the second embedded optical engine 2201B are utilized to transmit and receive optical signals between the second optical fiber 2403 (e.g., signal fiber) and the first photonic interconnect structure 2100. In particular, the first photonic components 107 of the second embedded optical engine 2201B convert electrical signals to optical signals for transmission along the second optical fiber 2403, and convert optical signals from the second optical fiber 2403 to electrical signals. Accordingly, the first photonic components 107 of the second embedded optical engine 2201B is responsible for the input/output (I/O) of optical signals to/from the second optical fiber 2403.

Figure 25:
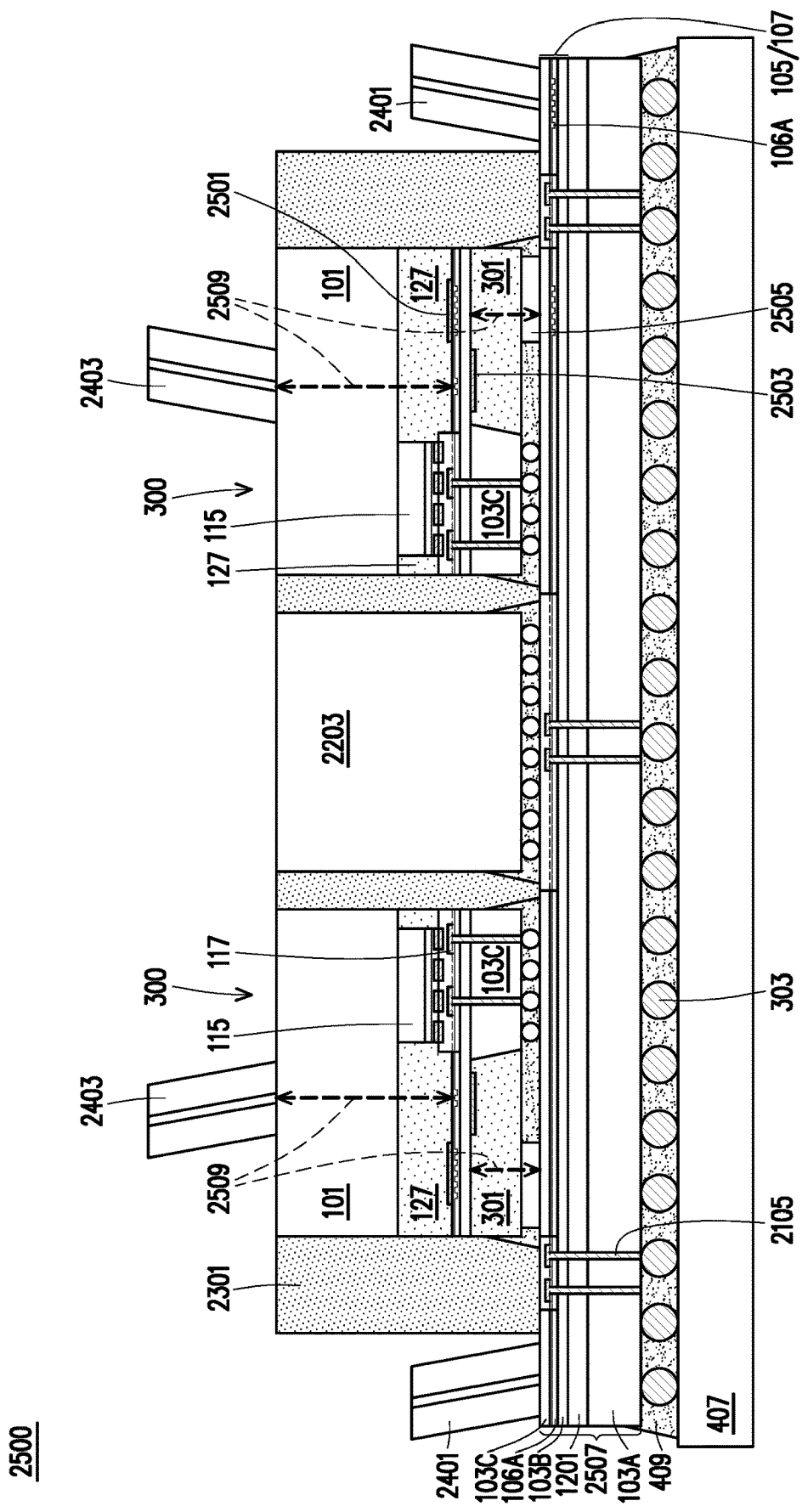
FIG. 25 illustrates formation of an eighth package assembly using two optical engines, according to still further embodiments.

FIG. 25 illustrates another embodiment of an eighth package assembly 2500, according to some embodiments. The eighth package assembly 2500 is similar to the seventh package assembly 2400 of FIG. 24 except that the eighth package assembly 2500 also includes first optical engines 300 comprising an optional front-side (FS) Mirror ARC 2501, and an optional backside (BS) Mirror ARC 2503, index-matching glue 2505 and a second photonic interconnect structure 2507 comprising the second waveguide material layer 1201.

According to some embodiments, the second photonic interconnect structure 2501 is formed with the second waveguide material layer 1201 (e.g., silicon nitride) between the buried oxide layer 103B and the semiconductor substrate 103A. However, any suitable material may be used for the second waveguide material layer 1201.

The first optical engines 300 may be formed with the optional backside (BS) Mirror ARC 2503 by initially depositing and patterning the ARC material on the semiconductor substrate 103A prior to forming the buried oxide layer 103B, as described above. The ARC material may be an anti-reflective film such as single layer ARC and/or double layer ARC materials (e.g., aluminum oxide, titanium oxide, silicon oxide, combinations, or the like). However, any suitable anti-reflective material may be used. Once deposited, the optional backside (BS) Mirror ARC 2503 may be patterned using, e.g., a photolithographic masking and etching process, whereby a photoresist is placed, exposed, and developed, and the photoresist is then used as a mask during an anisotropic etching process. However, any suitable process for patterning the optional backside (BS) Mirror ARC 2503 may be utilized.

The first optical engines 300 may be formed with the optional front-side (FS) Mirror ARC 2501 by initially depositing and patterning the ARC material over the first waveguides 105 and/or the first photonic components 107 prior to forming the gap-fill material 127, as described above. The optional front-side (FS) Mirror ARC 2501 may be formed using any of the materials and processes suitable for forming the optional backside (BS) Mirror ARC 2503.

The index-matching glue 2505 may be used to attach the first optical engines 300 to the second photonic interconnect structure 2507. The index-matching glue 2505 may be, for example, an optically clear adhesive (OCA) optical resins, optical glass, optical ceramics, combinations, or the like) and matches an index of the first backfill structure 301. The index-matching glue 2505 may be applied in any suitable form (e.g., liquid, film, tape, or the like) using a suitable process (e.g., adhesive dispenser, printer, or the like). During operation, the index-matching glue 2505 is used to conduct optical communications between the first optical engines 300 and the waveguides of the second photonic interconnect structure 2507, as indicated by the third directional arrows 2509.

FIG. 25 further illustrates an encapsulation of the first optical engines 300, the second semiconductor die 2203 (e.g., ASIC, Switch, or the like), and the first waveguides 105 over the second photonic interconnect structure 2507, according to some embodiments. The encapsulant 2301 may be formed using any of the materials and techniques, as set forth above. In some embodiments, the first waveguides 105 remain exposed at a perimeter of the second photonic interconnect structure 2507. Once the encapsulant 2301 has been formed, the second photonic interconnect structure 2507 may be mounted to the package substrate 407 using the first external contacts 303, as set forth above. Once mounted, the first underfill 409 may be formed between the second photonic interconnect structure 2507 and the package substrate 407. The signal fibers 2403 may be attached to the backsides of the 300 and the power fibers 2401 may be attached to the exposed surfaces of the first waveguides 105.

According to some embodiments, the signal fibers 2403 and the power fibers 2401 may be attached using an optical adhesive. In other embodiments (not specifically illustrated), backside cavities may be formed through the encapsulant 2301 by forming the vertical fiber attachment units 2305 used to secure the power fibers 2401, as set forth above. However, any suitable materials and techniques may be used to attach signal fibers 2403 and/or the power fibers 2401.

Figure 26:
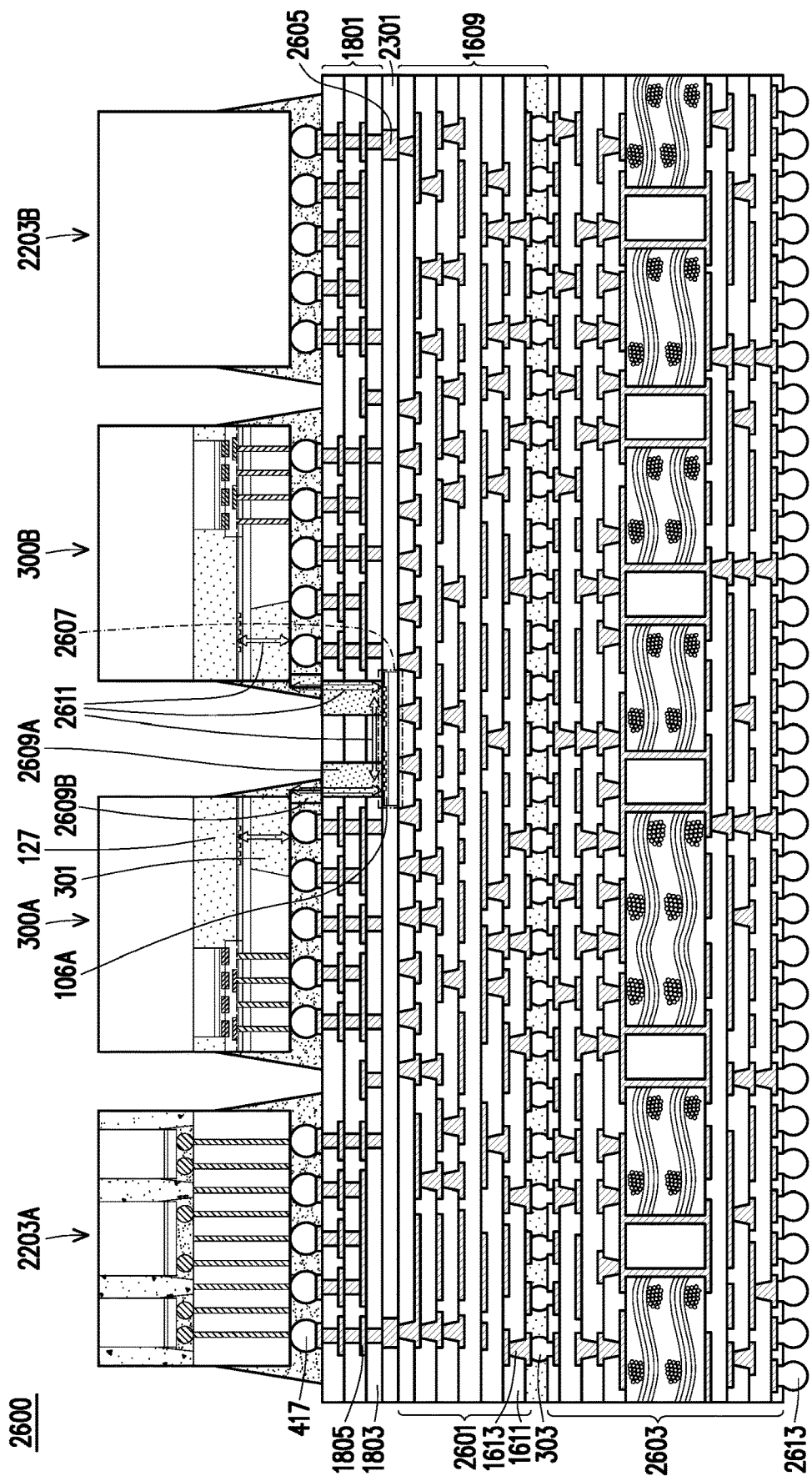
FIG. 26 illustrates formation of a ninth package assembly using two optical engines, according to still further embodiments.

FIG. 26 illustrates a formation of a ninth package assembly 2600, according to still further embodiments. Two optical engines 300A and 300B (see FIG. 3) are mounted to a third photonic interconnect structure 2601 and optically communicate via an embedded Si waveguide 2607. The optical engines 300A and 300B are electrically connected to and controlled by the second semiconductor dies 2203A and 2203B (e.g., Host ASICs) through the third photonic interconnect structure 2601, respectively.

According to some embodiments, the third photonic interconnect structure 2601 is formed by initially forming conductive pillars 2605 (e.g., Cu pillars) and then placing or forming an embedded Si waveguide 2607 (e.g., photonic die 117 and first waveguide 105 of FIG. 3) on a carrier substrate (not separately illustrated). An encapsulant 2301 (e.g., molding compound) may be formed or placed over the conductive pillars 2605 and the embedded Si waveguide 2607, using any of the encapsulation materials and techniques set forth above. Once encapsulated, a chemical mechanical planarization (CMP) process may be performed to thin the embedded Si waveguide 2607 and encapsulant 2301, leaving behind the silicon waveguide and any other desired structures such as grating couplers and to expose the conductive pillars 2605. As such, the embedded Si waveguide 2607 and the conductive pillars 2605 may have a planar surface that is also coplanar with the encapsulant 2301.

FIG. 26 further illustrates the formation of the front side redistribution structure 1609 over the embedded Si waveguide 2607, the conductive pillars 2605, and the encapsulant 2301, according to some embodiments. The front side redistribution structure 1609 may be formed using any of the materials and processes described above and may be formed with any desired number of the front side dielectric layers 1611 and the front side redistribution layers 1613.

Once the front side redistribution structure 1609 has been formed, a second carrier may be applied to the exposed surface of the front side redistribution structure 1609 and the first carrier is removed. Once the first carrier has been removed, a backside redistribution structure 1801 may be formed over the embedded Si waveguide 2607, the conductive pillars 2605, and the encapsulant 2301, according to some embodiments.

FIG. 26 further illustrates a formation of first optical through vias (OTV) 2609A optically coupling the embedded Si waveguide 2607 through the backside redistribution structure 1801 and second optical through vias 2609B optically coupling the first optical through vias 2609A to subsequently placed first optical engines 300. The first optical through vias 2609A and second optical through vias 2609B may be collectively referred to herein as the optical through vias 2609. The optical through vias 2609 may be formed by initially forming openings through the backside dielectric layers 1803 and exposing the embedded Si waveguide 2607 in locations over the grating couplers 106A.

According to some embodiments, an optical fill material (e.g., index-matching polymer) is deposited within the openings and then hardened, for example, using an anneal process to form the first optical through vias 2609A. Once the first optical through vias 2609A have been formed, the second optical through vias 2609B may be formed over the backside redistribution structure 1801 by initially depositing and patterning a photoresist and using the patterned photoresist as a mask. A second optical fill material (e.g., index-matching underfill) may be deposited in the openings and then hardened to form the second optical through vias 2609B, according to some embodiments. Once formed, the photoresist is removed in a process such as ashing. The optical through vias 2609 may be formed using any of the materials and techniques suitable for forming the index-matching glue 2505 and/or the optical windows 2103, as set forth above.

Once formed, the second optical through vias 2609B and the second external contacts 417 may be used to mount the first optical engines 300A and 300B to the backside redistribution structure 18oi, according to some embodiments. In some embodiments, the first backfill structures 301 may be attached to the second optical through vias 2609B using an adhesive film and the second external contacts 417 may be attached to contact pads of the 1801 using, for example, a solder reflow process. However, any suitable connectors and mounting techniques may be used. According to some embodiments, the second semiconductor dies 2203A and 2203B may be mounted to the backside redistribution structure 1801 using the first external contacts 303. However, any suitable connectors and mounting techniques may be used.

During operation, the first optical through vias 2609A are used to conduct optical communications between the first optical engines 300 and the embedded Si waveguide 2607 (e.g., die-to-die optical communications), as indicated by the fourth directional arrows 2611. The second semiconductor dies 2203A and 2203B may electrically communicate to one another and/or to the first optical engines 300A and 300B through the third photonic interconnect structure 2601.

FIG. 26 further illustrates mounting of the third photonic interconnect structure 2601 to an optional interposer 2603 using the first external contacts 303, for example, between the formation of the first optical through vias 2609A and the formation of the second optical through vias 2609B. According to some embodiments, the optional interposer 2603 comprises second external contacts 2613 for external connection to the ninth package assembly 2600. In some embodiments, the second external contacts 2613 are formed as solder balls. However, any suitable contacts may be used.

By utilizing the methods and structures presented herein, more economical manufacturing processes may be utilized to help prevent optical losses with edge couplers for photonic optical engines. In particular, optical losses due to light beams overlapping with substrate materials (e.g., silicon) may be reduced.

In accordance with some embodiments, a method includes: providing a first layer between a second layer and a semiconductor substrate; forming a first waveguide in the second layer; forming a photonic die over the first waveguide; forming a first cavity in the semiconductor substrate and exposing the first layer; filling the first cavity with a first backfill material; and electrically coupling an electronic die to the photonic die. In an embodiment the method further includes forming a second cavity in the semiconductor substrate and exposing the first layer; and filling the second cavity with a second backfill material, the second backfill material being different from the first backfill material. In an embodiment the method further includes forming through insulator vias in the semiconductor substrate prior to the forming the first cavity. In an embodiment the method further includes electrically connecting the through insulator vias to a package substrate. In an embodiment the electrically coupling the electronic die to the photonic die comprises hybrid bonding the electronic die to the photonic die. In an embodiment the method further includes mounting the electronic die adjacent the semiconductor substrate and electrically coupling the electronic die to the through insulator vias. In an embodiment the first layer comprises silicon oxide.

In accordance with another embodiment, a method includes: forming a first waveguide adjacent to a first oxide layer; forming a photonic die adjacent and optically coupled to the first waveguide; hybrid bonding an electronic die to the photonic die; and forming a second waveguide adjacent the first oxide layer opposite the first waveguide, the second waveguide being optically coupled to the first waveguide through the first oxide layer. In an embodiment the method further includes, prior to forming the second waveguide, encapsulating the photonic die, the electronic die and a through molding via in an encapsulant, wherein the forming the second waveguide forms the second waveguide with a polymer material. In an embodiment forming the second waveguide comprises forming part of the second waveguide adjacent the encapsulant. In an embodiment the method further includes forming a first redistribution structure over the second waveguide. In an embodiment the method further includes forming a second redistribution structure adjacent and electrically coupled to the through molding via. In an embodiment the method further includes: forming the second waveguide using a nitride material; forming a second oxide layer over the second waveguide; and forming a conductive via through the second oxide layer, the second waveguide, and the first oxide layer, the conductive via being electrically coupled to the photonic die. In an embodiment the method further includes, prior to the forming the conductive via, forming a third waveguide over the second oxide layer using a silicon nitride material, the third waveguide being optically coupled to the second waveguide.

In accordance with yet another embodiment, a semiconductor device includes: a first oxide substrate structure adjacent a semiconductor substrate; an oxide layer over the semiconductor substrate and the first oxide substrate structure; a first waveguide over the oxide layer; a photonic die over the oxide layer and optically coupled to the first waveguide; and an electronic die electrically coupled to the photonic die. In an embodiment the first waveguide comprises a silicon tip, wherein the silicon tip and the first oxide substrate are coterminous with a sidewall of the semiconductor device. In an embodiment first die contacts of the electronic die are bonded to second die contacts of the photonic die. In an embodiment the semiconductor device further includes a through insulator via extending through the oxide layer and the semiconductor substrate, the through insulator via electrically coupling the photonic die to the electronic die. In an embodiment the semiconductor device further includes a second oxide substrate structure extending through the semiconductor substrate, wherein the first oxide substrate comprises a first material and the second oxide substrate structure comprises a second material that is different from the first material. In an embodiment the semiconductor device further includes: a package substrate; a through insulator via through the oxide layer and the semiconductor substrate, the through insulator via being electrically coupled to the photonic die; and an external contact electrically coupling the through insulator via to the package substrate, wherein the electronic die is mounted to the package substrate and the electronic die is electrically coupled to the photonic die by the package substrate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
   a first oxide substrate structure adjacent a semiconductor substrate along a first direction, a first surface of the first oxide substrate structure facing a second direction different than the first direction, a first surface of the semiconductor substrate facing the second direction;
   an oxide layer over the first surface of the semiconductor substrate along the second direction and the first surface of the first oxide substrate structure along the second direction;
   a first waveguide over the oxide layer;
   a photonic die over the oxide layer and optically coupled to the first waveguide; and
   an electronic die electrically coupled to the photonic die.

2. The semiconductor device of claim 1, wherein the first waveguide comprises a silicon tip, wherein the silicon tip and the first oxide substrate structure are coterminous.

3. The semiconductor device of claim 1, wherein first die contacts of the electronic die are bonded to second die contacts of the photonic die.

4. The semiconductor device of claim 1, further comprising a through insulator via extending through the oxide layer and the semiconductor substrate, the through insulator via electrically coupling the photonic die to the electronic die.

5. The semiconductor device of claim 4, further comprising a second oxide substrate structure extending through the semiconductor substrate, wherein the first oxide substrate structure comprises a first material and the second oxide substrate structure comprises a second material that is different from the first material.

6. The semiconductor device of claim 1, further comprising:
   a package substrate;
   a through insulator via extending through the oxide layer and the semiconductor substrate, the through insulator via being electrically coupled to the photonic die; and
   an external contact electrically coupling the through insulator via to the package substrate, wherein the electronic die is mounted to the package substrate and the electronic die is electrically coupled to the photonic die by the package substrate.

7. A semiconductor device, comprising:
   a semiconductor substrate, the semiconductor substrate having a first surface and a second surface opposite the first surface;
   a first layer over the first surface of the semiconductor substrate;
   a second layer over the first layer, wherein the first layer is between the second layer and the semiconductor substrate;
   a first dielectric fill structure in a first cavity in the semiconductor substrate, the first dielectric fill structure extending from the second surface of the semiconductor substrate to the first layer, wherein all surfaces of the second layer are free from contact with the first dielectric fill structure;
a first waveguide in the second layer;
a photonic die over the first waveguide, wherein the first layer and the second layer are between the photonic die and the semiconductor substrate; and
an electronic die bonded to the photonic die, wherein the photonic die is between the electronic die and the semiconductor substrate.

8. The semiconductor device of claim 7, further comprising:
a second dielectric fill structure in a second cavity in the semiconductor substrate, the second dielectric fill structure extending from the second surface of the semiconductor substrate to the first layer.

9. The semiconductor device of claim 7, further comprising:
through vias in the semiconductor substrate, wherein the through vias are conductive.

10. The semiconductor device of claim 9, further comprising:
a package substrate attached to the semiconductor substrate, wherein the package substrate comprises conductive features electrically coupled to corresponding ones of the through vias.

11. The semiconductor device of claim 9, wherein the electronic die is bonded to the photonic die with dielectric-to-dielectric and metal-to-metal bonds.

12. The semiconductor device of claim 9, wherein the first layer comprises a silicon oxide layer.

13. The semiconductor device of claim 9, wherein the second layer comprises a silicon layer.

14. A semiconductor device, comprising:
a first substrate, the first substrate comprising:
a first silicon layer,
a dielectric fill adjacent the first silicon layer,
an insulating layer over the first silicon layer and the dielectric fill, and
a second silicon layer over the insulating layer, the second silicon layer comprising a first waveguide, the first waveguide overlapping the dielectric fill along a line perpendicular to a major surface of the first silicon layer;
a passivation layer over the second silicon layer;
a photonic die over the passivation layer; and
an electronic die attached to the photonic die.

15. The semiconductor device of claim 14, further comprising:
a package substrate attached to the first substrate.

16. The semiconductor device of claim 15, further comprising:
a spacer between the package substrate and the first substrate.

17. The semiconductor device of claim 15, further comprising:
a first fiber attachment housing attached to the package substrate, wherein the first fiber attachment housing comprises an optical fiber, wherein the optical fiber is aligned with the first waveguide.

18. The semiconductor device of claim 17, wherein the first fiber attachment housing is attached to the package substrate with a transparent adhesive, wherein the transparent adhesive extends between the first fiber attachment housing and the first substrate.

19. The semiconductor device of claim 17, further comprising:
an encapsulant along sidewalls of the electronic die; and
a support substrate over the electronic die and the encapsulant, the support substrate having an alignment tab, wherein the first fiber attachment housing comprises an alignment notch, wherein the alignment tab is aligned to the alignment notch.

20. The semiconductor device of claim 17, wherein the optical fiber overlaps the dielectric fill.

* * * * *